(12) United States Patent
Smith et al.

(10) Patent No.: US 9,474,406 B2
(45) Date of Patent: Oct. 25, 2016

(54) APPARATUS WITH BEVERAGE CARTRIDGE HOLDER HAVING MOVABLE OUTLET

(71) Applicant: Keurig Green Mountain, Inc., Waterbury, VT (US)

(72) Inventors: Geoffrey Y. Smith, Melrose, MA (US); Jonathan Alexander Brodie, North Billerica, MA (US); Stuart Jay Foster, Somerville, MA (US); James E. Shepard, Marblehead, MA (US); Yoav Rabino, Newton, MA (US); Ian Tinkler, Wakefield, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 60 days.

(21) Appl. No.: 14/157,889

(22) Filed: Jan. 17, 2014

(65) Prior Publication Data

US 2015/0201790 A1    Jul. 23, 2015

(51) Int. Cl.

| | |
|---|---|
| *A47J 31/40* | (2006.01) |
| *A47J 31/44* | (2006.01) |
| *A47J 31/46* | (2006.01) |
| *B65D 85/804* | (2006.01) |
| *A23F 3/18* | (2006.01) |
| *A23F 5/26* | (2006.01) |
| *A47J 31/06* | (2006.01) |
| *A47J 31/36* | (2006.01) |

(52) U.S. Cl.
CPC ............ *A47J 31/407* (2013.01); *A23F 3/18* (2013.01); *A23F 5/262* (2013.01); *A47J 31/0673* (2013.01); *A47J 31/3628* (2013.01); *A47J 31/3695* (2013.01); *A47J 31/4492* (2013.01); *A47J 31/46* (2013.01); *B65D 85/8043* (2013.01)

(58) Field of Classification Search
CPC ............... A47J 31/407; A47J 31/4492; A47J 31/0673; A47J 31/46; A47J 31/3628; A47J 31/3695; A23F 5/262; A23F 3/18; B65D 85/8043
See application file for complete search history.

(56) References Cited

U.S. PATENT DOCUMENTS

| | | | |
|---|---|---|---|
| 4,550,652 | A  | 11/1985 | Da Silva |
| 6,584,888 | B2 | 7/2003  | Cortese |
| 6,698,332 | B2 | 3/2004  | Kollep et al. |
| 6,955,116 | B2 | 10/2005 | Hale |

(Continued)

FOREIGN PATENT DOCUMENTS

| | | |
|---|---|---|
| EP | 1101430 A1 | 5/2001 |
| EP | 1107201 A2 | 6/2001 |

(Continued)

OTHER PUBLICATIONS

U.S. Appl. No. 15/056,316, filed Feb. 29, 2016, Tinkler et al.

*Primary Examiner* — Anthony Weier
(74) *Attorney, Agent, or Firm* — Wolf, Greenfield & Sacks, P.C.

(57) ABSTRACT

A method and apparatus for controlling operation of a beverage forming machine arranged for use with cartridges of different types, or receiving an upwardly flowing beverage from a cartridge. A beverage outlet may be movable to receive beverage from a cartridge of a first type, and to not receive beverage from a cartridge of a second type. Different cartridge characteristics may be detected by multiple detectors, e.g., for detecting a presence/absence of a cartridge, a cartridge type and/or an authorization feature.

16 Claims, 14 Drawing Sheets

(56) References Cited

U.S. PATENT DOCUMENTS

| | | |
|---|---|---|
| 7,093,530 B2 | 8/2006 | Meister et al. |
| 7,165,488 B2 | 1/2007 | Bragg et al. |
| 7,216,582 B2 | 5/2007 | Yoakim et al. |
| 7,255,039 B2 | 8/2007 | Halliday |
| 7,318,372 B2 | 1/2008 | Cooke |
| 7,325,479 B2 | 2/2008 | Laigneau |
| 7,335,387 B2 | 2/2008 | Hayes et al. |
| 7,513,192 B2 | 4/2009 | Sullivan et al. |
| 7,540,232 B2 | 6/2009 | Bates et al. |
| 7,569,243 B2 | 8/2009 | Yoakim et al. |
| 8,109,200 B2 | 2/2012 | Hansen |
| 8,210,095 B2 | 7/2012 | Brezovnik et al. |
| 9,144,343 B2 * | 9/2015 | Oh |
| 9,149,150 B2 * | 10/2015 | Oh |
| 2004/0045257 A1 | 3/2004 | Bakker et al. |
| 2010/0037779 A1 | 2/2010 | Pecci et al. |
| 2010/0206177 A1 | 8/2010 | Ricotti |
| 2011/0000377 A1 | 1/2011 | Favre |
| 2011/0017071 A1 | 1/2011 | Stefanoni |
| 2012/0058226 A1 | 3/2012 | Winkler |
| 2013/0114089 A1 | 5/2013 | Jarisch et al. |
| 2013/0133522 A1 | 5/2013 | Denisart et al. |
| 2014/0026761 A1 * | 1/2014 | Bartoli et al. .................. 99/295 |
| 2015/0104550 A1 * | 4/2015 | Oh ................. 426/231 |

FOREIGN PATENT DOCUMENTS

| | | |
|---|---|---|
| EP | 1804629 | 3/2006 |
| WO | WO 2004004522 A1 | 1/2004 |
| WO | WO 2012104760 A1 | 8/2012 |
| WO | WO 2012156167 A1 | 11/2012 |
| WO | WO 2013079814 A1 | 6/2013 |

* cited by examiner

APPARATUS WITH BEVERAGE CARTRIDGE HOLDER HAVING MOVABLE OUTLET

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Pat. No. 8,361,527 discloses a beverage forming system that uses a beverage cartridge containing a beverage material to make a beverage by introducing liquid into the cartridge. Liquid provided to the cartridge may be heated in a tank prior to delivery to the cartridge.

SUMMARY OF INVENTION

Aspects of the invention relate to methods and apparatus for using cartridges of different size and/or shape in a beverage forming machine. For example, in some embodiments, a cartridge holder may be arranged to receive and support cartridges that have different sizes, e.g., circular rims of different diameters, and/or that have different shapes, e.g., one cartridge may have a circular rim while another cartridge may have a rim with an irregular shape, without the user having to manipulate an adapter or other component of the cartridge holder. In one embodiment, the cartridge holder may include two or more beverage inlets or outlets that can be selectively employed based on a cartridge received in the cartridge holder. Thus, a user may simply place cartridges having different sizes or shapes in the cartridge holder without having to take any specific action to configure the machine to interact with the cartridges.

In an aspect of the invention, a beverage forming machine may provide water or other fluid to different cartridges, and/or may receive beverage from different cartridges, using different inlet and/or outlet ports. For example, a first cartridge may receive water from an inlet port that pierces a top lid of the cartridge, and beverage may exit the cartridge to an outlet port that also pierces the top lid of the cartridge (though in a different location than the inlet port). However, a second cartridge held by the same cartridge holder may receive water from an inlet port that pierces the cartridge at a different location (such as the bottom of the cartridge as opposed to the top), and/or beverage may exit the second cartridge to an outlet port that pierces the cartridge at a different location (such as the bottom of the cartridge). For example, in one aspect of the invention, inflow of water into a first cartridge may be downwardly into the cartridge, while beverage outflow is upwardly from the cartridge. In contrast, inflow of water into a second cartridge may be downwardly into the cartridge, but beverage outflow may be downwardly from the second cartridge. Thus, inflow and/or outflow for different cartridges may occur in different relative places and/or directions.

In one embodiment, a first cartridge may be pierced in two locations at a top lid for inlet and outlet openings, respectively. Water or other fluid may be introduced into the cartridge in a downward direction through the inlet opening, and beverage may exit the cartridge in an upward direction through the outlet opening. In contrast, a second cartridge may be pierced in one location at the top lid for an inlet opening, and pierced at a location below the lid, e.g., at a bottom of the cartridge, for an outlet opening. Thus, water or other fluid may be introduced into the cartridge in a downward direction through the inlet opening, and beverage may exit the cartridge in a downward direction through the outlet opening. Such different flows may be accommodated by a single cartridge holder which can not only accommodate differently sized and/or shaped cartridges, but also different flow arrangements for fluid into and beverage out of the cartridges.

In one aspect of the invention, a beverage forming apparatus includes a frame arranged to support components of the beverage forming apparatus, and a cartridge holder having an opening arranged to engage with a cartridge placed in the opening and support a weight of the cartridge. The cartridge holder also includes a first beverage outlet arranged to receive beverage from a cartridge held by the cartridge holder, with the first beverage outlet being movable relative to the opening between first and second positions based on a size and/or shape of a cartridge held by the cartridge holder. For example, the first beverage outlet may be arranged to not receive beverage from a cartridge in the first position, and be arranged to receive beverage from a cartridge in the second position. In some arrangements, the first beverage outlet may be positioned outside of a cartridge receiving area of the cartridge holder in the first position, and the first beverage outlet may be positioned within a cartridge receiving area of the cartridge holder in the second position. A cover may be arranged to cooperate with the cartridge holder to at least partially enclose a cartridge held by the cartridge holder for formation of a beverage using the cartridge, and a liquid supply system may be arranged to provide a liquid for combination with a beverage medium in a cartridge held by the cartridge holder to form a beverage.

In some embodiments, the first beverage outlet may be moved from the second position to the first position by a cartridge contacting and moving the first beverage outlet as the cartridge is placed in the cartridge holder. For example, upon placement of a cartridge into the cartridge holder, the first beverage outlet may be positioned in a second position in a cartridge receiving area. However, the cartridge may contact the first beverage outlet and move the first beverage outlet from the second position to a first position outside of a cartridge receiving area.

In some embodiments, the cartridge holder may be arranged to receive first and second cartridges that are differently sized and/or shaped relative to each other in a region where the cartridge holder engages with the first and second cartridges. For example, the cartridges may have a different size and/or shape near a rim of the cartridges where the cartridge holder engages with the cartridges. The first beverage outlet may be positioned in the first position with the first cartridge received in the cartridge holder, and positioned in the second position with the second cartridge received in the cartridge holder. In some cases, a second beverage outlet may receive beverage from the second cartridge since the first beverage outlet is positioned to not receive beverage. Alternately, beverage may exit from the second cartridge directly to a user's cup or other container, or to another beverage flow path.

In one embodiment, the cartridge holder may include a trigger that is mounted for movement relative to the opening, and movement of the trigger may move the first beverage outlet between the first and second positions. For example, the trigger may include a slidable element that is moved when contacted by a cartridge of a particular type, e.g., contact with a spout of a first cartridge may slide the trigger and move the first beverage outlet from the second position to the first position. With the second cartridge received by the cartridge holder, the trigger may remain stationary relative to the opening such that the first beverage outlet is in the second position to receive beverage from the second cartridge, e.g., the first beverage outlet may pierce the second cartridge to allow beverage to exit.

In one embodiment, the cover includes a liquid inlet to introduce liquid from the liquid supply system to a cartridge held in the cartridge holder. Also, in some cases, the cover may include a second beverage outlet to receive beverage exiting a cartridge held in the cartridge holder. The liquid inlet and the first and second beverage outlets may each include a piercing element to pierce a cartridge, such as a needle. The piercing elements of the liquid inlet and the second beverage outlet may face downwardly, and the first beverage outlet may face upwardly with the cover in a closed position to at least partially enclose a cartridge. That is, the cover may be movable relative to the cartridge holder between an open position in which the cartridge holder is exposed to receive a cartridge into the opening, and a closed position in which the cover cooperates with the cartridge holder to at least partially enclose a cartridge held by the cartridge holder.

In some embodiments, the cartridge holder may be arranged to receive a first cartridge having a circular rim, and a second cartridge having a rim with a partially circular portion and a spout section extending outwardly from the partially circular portion. A trigger of the cartridge holder may be arranged to interact with the spout section of the second cartridge, and a linkage may be connected to the trigger and operable to cause movement of the first beverage outlet between the first and second positions based on movement of the trigger.

In another aspect of the invention, a method for forming a beverage using a beverage forming apparatus includes providing a beverage forming apparatus having a cartridge holder with an opening and arranged to engage with and support a cartridge placed in the opening of the cartridge holder. A first or second cartridge is provided into the opening of the cartridge holder, with the first and second cartridges being differently sized and/or shaped relative to each other in a region where the cartridge holder engages with the first and second cartridges. A first beverage outlet is moved relative to the opening based on whether the first or second cartridge is provided into the opening, and liquid is combined with a beverage medium in the first or second cartridge held by the cartridge holder to form a beverage. Beverage is received from the cartridge at the first beverage outlet if the second cartridge is held by the cartridge holder, and not received from the cartridge at the first beverage outlet if the first cartridge is held by the cartridge holder. In one embodiment, the first cartridge includes a spout portion, and the step of moving the first beverage outlet includes moving the first beverage outlet to a first position if the first cartridge is placed in the cartridge holder. For example, the step of moving may include sliding a trigger based on contact of the trigger with the spout portion, with sliding of the trigger causing movement of the first beverage outlet to the first position. In contrast, when a second cartridge is placed in the cartridge holder, the step of moving may include allowing the first beverage outlet to remain in a second position, e.g., to pierce the second cartridge and receive beverage from the second cartridge.

In one embodiment, the method includes moving a cover to at least partially enclose a cartridge held by the cartridge holder, and the step of combining liquid may include introducing liquid from a liquid inlet of the cover into the cartridge held by the cartridge holder. The step of receiving beverage may include receiving beverage at a second beverage outlet attached to the cover if the first cartridge is held by the cartridge holder.

In another aspect of the invention, a beverage forming apparatus includes a frame arranged to support components of the beverage forming apparatus, and a cartridge holder arranged to hold a cartridge during formation of a beverage using the cartridge. An inlet may be arranged to direct fluid into a cartridge held by the cartridge holder in a downward direction, and a first beverage outlet may be arranged to receive beverage from a cartridge held by the cartridge holder such that flow of beverage from the cartridge to the first beverage outlet is in an upward direction. Downward movement of fluid into the cartridge and/or upward movement of beverage from the cartridge need not be along a perfectly vertical line, but rather may have some horizontal component as well as a vertical component. Thus, flow along a line that is 45 degrees to vertical may be said to be downward (or upward). A liquid supply system may be arranged to provide a liquid for combination with a beverage medium in a cartridge held by the cartridge holder to form a beverage, e.g., the liquid supply may provide heated or cooled water or other liquid to the cartridge.

In one embodiment, a cover may be arranged to cooperate with the cartridge holder to at least partially enclose a cartridge held by the cartridge holder for formation of a beverage using the cartridge. The inlet and first beverage outlet may be mounted to the cover, e.g., including respective piercing elements depending from the cover to pierce the cartridge. The piercing elements may form respective opening in a cartridge, e.g., in a lid of the cartridge, and in some embodiments, the beverage outlet opening formed in the cartridge may be positioned below the fluid inlet opening. As in some of the embodiments discussed above, the cartridge holder may be arranged to receive and engage with first and second cartridges having a different size and/or shape in a region where the cartridge holder engages with the cartridges. Also, the cartridge holder may include a second beverage outlet that is movable relative to the opening between first and second positions based on a size and/or shape of a cartridge held by the cartridge holder. For example, the second beverage outlet may be arranged to not receive beverage from a cartridge in the first position, and may be arranged to receive beverage from a cartridge in the second position. In one example, the first beverage outlet may be arranged to receive beverage from a first cartridge placed in the cartridge holder, and the second beverage outlet may be arranged to receive beverage from a second cartridge placed in the cartridge holder. When a first cartridge is placed in the cartridge holder, the second beverage outlet may be moved out of a cartridge receiving area.

In another aspect of the invention, a method for forming a beverage using a beverage forming apparatus includes providing a beverage forming apparatus having a cartridge holder arranged to engage with and support a cartridge placed in the cartridge holder. A cartridge may be provided in the cartridge holder, and fluid may be introduced into the cartridge in the cartridge holder to form a beverage. The fluid may be introduced into the cartridge in a downward direction, and beverage which flows in an upward direction while exiting from the cartridge may be received from the cartridge in the cartridge holder. In one embodiment, the method also includes moving a cover to at least partially enclose a cartridge held by the cartridge holder. Movement of the cover may cause piercing elements to form inlet and/or outlet openings in the cartridge. Thus, fluid may be introduced into the cartridge by an inlet of the cover, and beverage may be received by a beverage outlet on the cover. As noted above, the inlet opening may be formed above the outlet opening, and a seal may be formed with the cartridge at the inlet and outlet openings, e.g., to help resist leakage of fluid and/or beverage. Beverage received from the cartridge may be conducted downwardly to a user's container, e.g., via a conduit or other flow pathway.

In one embodiment, a first or second cartridge may be provided in the cartridge holder, where the first and second cartridges have a different size and/or shape, e.g., where the cartridge holder engages with the cartridges. The step of receiving a beverage may include receiving a beverage that exits the cartridge in an upward direction if a first cartridge is provided in the cartridge holder, and/or include receiving a beverage that exits the cartridge in a downward direction if a second cartridge is provided in the cartridge holder.

In another aspect of the invention, a beverage forming apparatus includes a frame arranged to support components of the beverage forming apparatus, and a cartridge holder arranged to receive a cartridge for use in forming a beverage. A first detector may be arranged to detect a presence or absence of a cartridge in the cartridge holder, a second detector may be arranged to identify a type of cartridge in the cartridge holder, and a third detector may be arranged to detect information related to whether a cartridge is authorized for use with the beverage forming apparatus. Thus, different characteristics of a cartridge may be detected using separate detectors that perform different functions. A liquid supply system may be arranged to provide a liquid for combination with a beverage medium in a cartridge held by the cartridge holder to form a beverage, and may be controlled by a control circuit based on information from the first, second and third detectors. For example, if the first detector detects an absence of a cartridge, the control circuit may cause the apparatus to perform a cleaning operation by which water is introduced into the cartridge holder to clean the holder and/or beverage flow paths. In one embodiment, the first detector may include an infrared sensor arranged to detect a presence or absence of a cartridge in the cartridge holder. In another example, the second detector may include a movable element that moves in response placement of a cartridge of a first type in the cartridge holder and remains stationary with placement of a cartridge of a second type in the cartridge holder. Detection of a first type of cartridge may cause the control circuit to adjust a temperature of water or other liquid used to form a beverage and/or make other adjustment to beverage formation parameters, such as a volume of liquid, a timing of liquid delivery to the cartridge, an addition of air to liquid delivered to the cartridge, and so on. In some embodiments, the third detector may include a detector that detects a spectral response of a substance on a cartridge in the cartridge holder to determine whether a cartridge is authorized for use. For example, the cartridge may include an ink or other material that provides a specific spectral response to being illuminated by a particular light. A circuit associated with the third detector and/or the control circuit may assess the spectral response detected from a cartridge and determine whether the cartridge is authorized for use in forming a beverage. The use of such security inks is widespread in the fields of bank documents, currency, and other products and will be well understood by those of skill in the art. By determining the authenticity of a cartridge, the apparatus may ensure that a suitable made and configured cartridge is used to form a beverage and that use of the cartridge will not harm the machine or cause user dissatisfaction, e.g., which may result with the use of an improperly configured cartridge.

In one embodiment, the apparatus includes a cover arranged to cooperate with the cartridge holder to at least partially enclose a cartridge held by the cartridge holder for formation of a beverage using the cartridge. The first and third detectors may be mounted to the cover and arranged to detect optical features of a cartridge in the cartridge holder. The second detector may be arranged to contact a part of the cartridge held in the cartridge holder, e.g., to detect the presence of a spout portion on the cartridge.

In another aspect of the invention, a method for forming a beverage using a beverage forming apparatus includes providing a beverage forming apparatus including a cartridge holder arranged to support a cartridge, providing a cartridge in the cartridge holder, and detecting whether a cartridge is present or absent in the cartridge holder using a first detector. A type of the cartridge in the cartridge holder may be detected, and whether the cartridge in the cartridge holder is authorized for use in forming a beverage may also be detected, e.g., using second and third detectors. The detectors may be arranged as discussed above, and control of the system may be based on information obtained by the detectors. A fluid may be provided to the cartridge holder based on information from the first, second and third detectors, e.g., if a cartridge is detected in the holder, liquid may be provided only if the cartridge is authorized for use.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
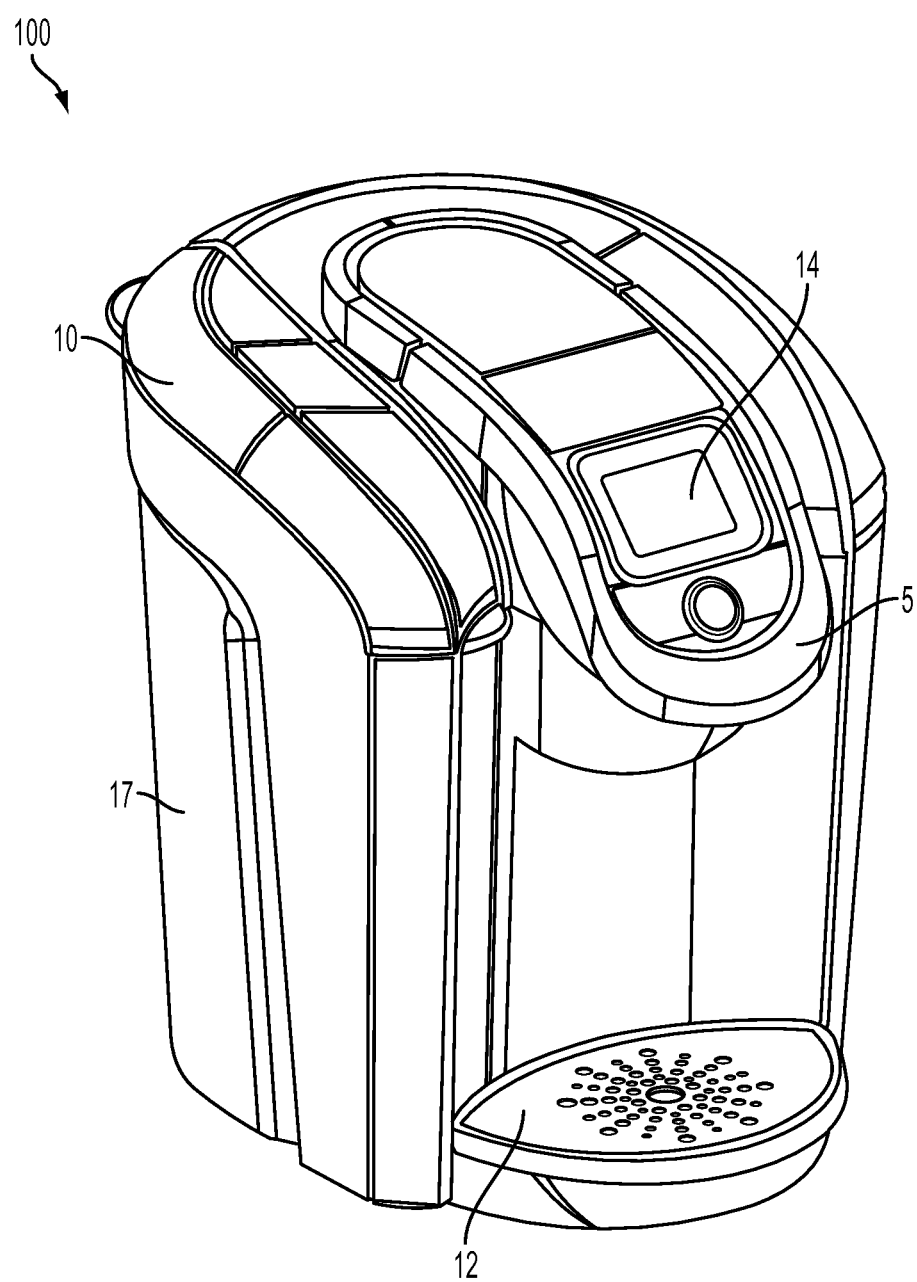
FIG. 1 is a front perspective view of a beverage forming apparatus in an illustrative embodiment.
Figure 2:
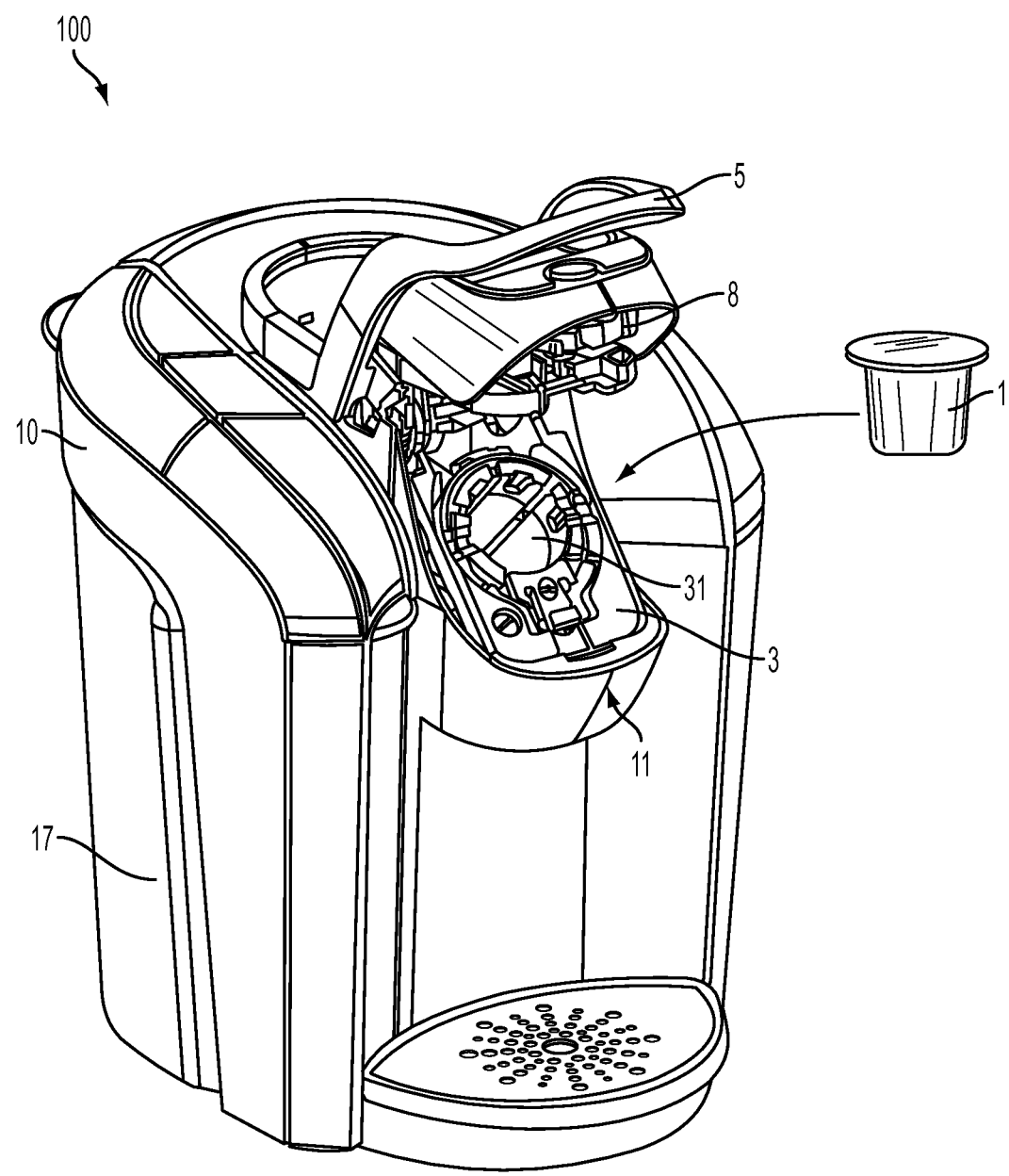
FIG. 2 is a front perspective view of the FIG. 1 embodiment with the cartridge holder exposed to receive a cartridge.

FIGS. 1 and 2 show a perspective view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 may be provided to the apparatus 100 and used to form a beverage that is deposited into a container 2, such as a cup. The cartridge 1 may be manually or automatically placed in a cartridge holder 3 of a beverage forming station 11 of the beverage forming machine 10. For example, the cartridge holder 3 may be exposed to receive the cartridge 1 when the user operates a handle 5 or other actuator. In this embodiment, movement of the handle 5 or other actuator may cause a cover 8 to move relative to the cartridge holder 3 (or the cover 8 and holder 3 to otherwise move relative to each other, e.g., by having the holder 3 move) to expose the holder 3 for reception of a cartridge 1. With the cartridge 1 placed in the cartridge holder 3, the actuator 5 may be operated to at least partially enclose the cartridge 1, e.g., so that the cover 8 moves to cooperate with the holder 3 to at least partially enclose the cartridge 1 so water or other precursor liquid can be introduced into the cartridge 1 to form a beverage. For example, with the cartridge 1 held in the beverage forming station 11 by the cartridge holder 3, the cartridge 1 may be pierced to form inlet and outlet openings through which water or other precursor liquid enters the cartridge 1 and beverage that exits the cartridge 1, respectively. U.S. Pat. No. 8,361,527 describes a cartridge and a system for introducing liquid into the cartridge that may be used in embodiments of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 may include any suitable materials to form a beverage, such as a carbon dioxide source used to carbonate water, a beverage mix, etc.

In this embodiment, the beverage forming machine 10 includes a housing 17 that houses and/or supports components of the machine 10, such as a user interface 14 used to control system operation, and defines a container receiving area 12 at which the container 2 is positionable to receive beverage dispensed by the machine 10 via a beverage outlet. Thus, at the container receiving area 12, the container 2 is associated with the machine 10 to receive a dispensed beverage and may be supported by the housing 17. The container 2 may be received at the container receiving area 12 so that the container 2 is at least partially surrounded by the housing 17, or the container 2 may be more exposed when at the container receiving area 12, as shown in FIG. 2.

In accordance with an aspect of the invention, a cartridge holder having an opening arranged to receive and support a cartridge may be arranged to receive cartridges of different sizes and/or shapes. In particular, the cartridges may have different sizes and/or shapes in a region where the cartridge holder engages with the cartridge to support the weight of the cartridge. For example, the cartridge holder may engage cartridges at a rim (e.g., at or below a flange to which a lid of the cartridge is attached), and different cartridges may have different rim sizes and/or shapes. In some embodiments, the cartridge holder may include an engagement portion that engages with the cartridges to support the cartridges in the holder. The engagement portion may include one or more movable portions that may move relative to each other to adjust a size and/or shape of an opening of the cartridge holder at which the cartridges are received. For example, the movable portions may be radially movable relative to each other so as to enlarge and/or reduce the size of the opening, or to adjust a shape of the opening. The moveable portions of the engagement portion may be compliant, e.g., include resilient sections that flex or otherwise resiliently deform to adjust the size of the opening so as to accommodate cartridges of different size/shape at the region where the engagement portion engages with the cartridges. The parts of the engagement portion at the opening may engage with a cartridge to support the weight of the cartridge or otherwise exert a force on the cartridge, e.g., to clamp the cartridge in place.

Figure 3:
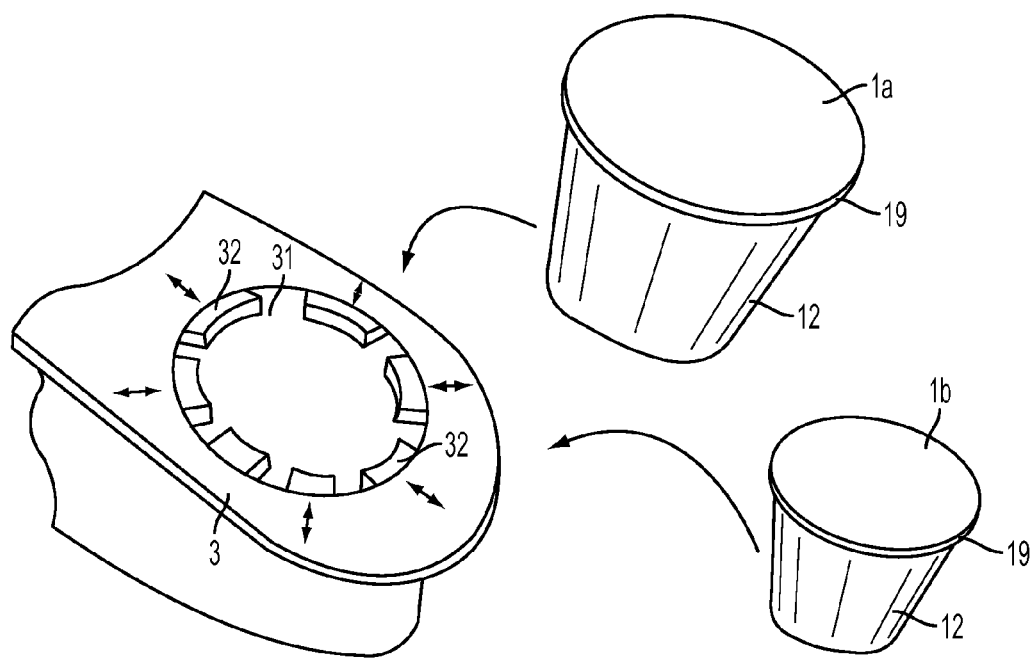
FIG. 3 is a perspective side view of a cartridge holder arranged to receive cartridges having different sizes.

FIG. 3 shows a partial, close up view of a cartridge holder 3 that may be employed in the FIGS. 1 and 2 embodiment. In this embodiment, an opening 31 of the cartridge holder 3 is oriented in an upwardly inclined position with the opening 31 facing toward a front of the machine 10. In this upwardly inclined position, an axis that is perpendicular to the plane of the opening 31 may be arranged at an angle above the horizontal of about 25 to 85 degrees, e.g., about 45 degrees. Such an orientation may make placement of a cartridge in the holder easy and convenient for a user, e.g., the holder 3 may securely hold the cartridge 1 with the cover 8 in the open position. Thereafter, the handle 5 may be returned to the position of FIG. 1, and in response the cover 8 may move to a closed position, e.g., such that the cover 8 is positioned over the opening 31. Closing of the cover 8 may also cause one or more piercing elements to pierce the cartridge, e.g., to introduce liquid into the cartridge or allow beverage to exit. Note, however, that the cartridge holder 3 need not be positioned in an upwardly inclined orientation, and instead may be arranged in a horizontal, vertical, inverted or other orientation. Also, the cartridge holder 3 may move relative to the cover 8 and/or housing 17, e.g., in a horizontal, translational movement, in a pivoting motion, etc. to open and close the beverage forming station 11.

In accordance with an aspect of the invention, the cartridge holder 3 may include one or more moveable portions 32 that are movable to adjust a size of the opening 31 at which the cartridges are received and engaged by the cartridge holder 3. For example, in this embodiment, the cartridge holder 3 is arranged to receive both a first cartridge 1a and a second cartridge 1b that are different from each other, e.g., the first cartridge 1a has a circular rim 19 with a diameter that is larger than the diameter of the circular rim 19 of the second cartridge 1b. The sizes of the rim diameters and the difference between the two may be any suitable value, e.g., one rim 19 may have diameter of about 50 mm and the other rim 19 diameter may be about 63 mm. The rim 19 diameter is relevant in this embodiment because the cartridge holder 3 engages with the cartridges 1 in a region at or near (e.g., just below) the rim 19. For example, the cartridge may be received into the opening 31 such that an underside of the rim 19 rests on the movable portions 32. In cases where the cartridges 1 are engaged by the holder 3 in other regions, such as at a mid-section of the cartridges 1, at a bottom of the cartridges, etc., the cartridges 1 may be different in size and/or shape in these regions.

In this embodiment, the movable portions 32 are movable in a radial direction as shown by the arrows so that the size of the opening 31 can be adjusted to receive the differently sized cartridges 1a, 1b. The movable portions 32 may move in any suitable way, such as being spring biased to move radially inwardly so that when the first and/or second cartridge 1a, 1b is placed in the holder 3, the movable portions 32 are pushed outwardly by the cartridge 1a, 1b sidewall 12 until the rim 19 contacts the movable portions 32 or other stop. In the embodiment shown in FIG. 3, each of the movable portions 32 may be slidable in a corresponding slot of the cartridge holder 3, and a coil or other spring (not shown) may bias each of the movable portions 32 to move radially inwardly in the corresponding slot. A stop or other feature may limit each movable portion's 32 radial movement, e.g., the movable portions 32 may be normally biased to a position in which the movable portions 32 define a size and/or shape of the opening 31 that corresponds to the smaller second cartridge 1b. Thus, when the second cartridge 1b placed in the holder 3, the movable portions 32 need not move to allow the holder to receive the second cartridge 1b. However, the movable portions 32 may move radially to accept the larger first cartridge 1a.

In other embodiments, the movable portions 32 may move in other ways, such as by a cam mechanism, screw drive, linkage, or other. For example, the movable portions may each have a cam follower pin that engages with a corresponding cam slot of a cam ring that extends around the opening 31. When the cam ring is rotated, the cam slots may move the follower pins radially in/out, and thereby moving the movable portions in/out. Other arrangements are possible, such as a diaphragm or iris mechanism used to open/close a photographic camera diaphragm so as to control an amount of light entering the camera lens or a collet chuck arrangement used to hold drill bits in a hand-held drill. In such cases, the cartridge holder 3 may include a user-operable element, such as a knob or ring, that is movable to adjust a size and/or shape of the opening 31.

Figure 4:
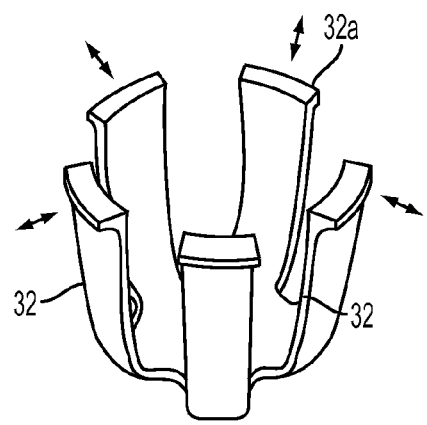
FIG. 4 is a perspective side view of an engagement portion for the cartridge holder mechanism in the FIG. 3 embodiment.

In another embodiment, an engagement portion of the cartridge holder may include one or more "finger" or wall portions that are arranged to move to accommodate differently sized/shaped cartridges. For example, FIG. 4 shows one embodiment of an engagement portion that includes five "fingers" or wall portions 32. The wall portions 32 are arranged together to form a sort of basket in which the cartridges 1 are placed. Thus, the structure shown in FIG. 4 may be positioned in the cartridge holder 3 such that top parts 32a of the wall portions 32 define the opening 31 of the holder 3, e.g., the top parts 32a may contact an underside of the rim 19 of the cartridges 1. The wall portions 32 may be joined together at a bottom of the engagement portion and include at least one resilient portion that allows the wall portions 32 to flex outwardly and/or inwardly so as to adjust a size and/or shape of the opening 31. For example, with the wall portions 32 at rest in an undeformed state, the smaller second cartridge 1b may be received into the opening 31 defined by the wall portions 32 with little or no movement of the wall portions 32. However, when the larger first cartridge 1a is placed in the opening 31, the sidewall 12 of the cartridge 1a may force the wall portions 32 to flex outwardly until the underside of the rim 19 contacts the top parts 32a of the wall portions 32.

FIGS. 3 and 4 also illustrate another aspect of the invention, i.e., that the cartridge holder may include one or more compliant portions that are resiliently deformable or otherwise movable to accommodate differently sized and/or shaped cartridges (at least in the region where the cartridges are engaged by the cartridge holder). That is, the engagement portion of FIG. 4 is compliant in that the wall portions 32 can resiliently change shape to accommodate differently sized and shaped cartridges (the same is true of the spring-loaded movable portions 32 in FIG. 3). This can allow for simplified cartridge insertion into a holder 3, e.g., because neither the machine nor user need take any specific action to adjust the size and/or shape of the opening 31. Instead, the interaction of the cartridge 1 with the cartridge holder 3 may itself adjust the size and/or shape of the opening 31 due to the compliant nature of the engagement portion. Of course, other arrangements for compliant movable portions 32 are possible, such as forming the movable portions in FIG. 3 of a foam or silicone material that deforms to adjust a size and/or shape of the opening 31.

Figure 5:
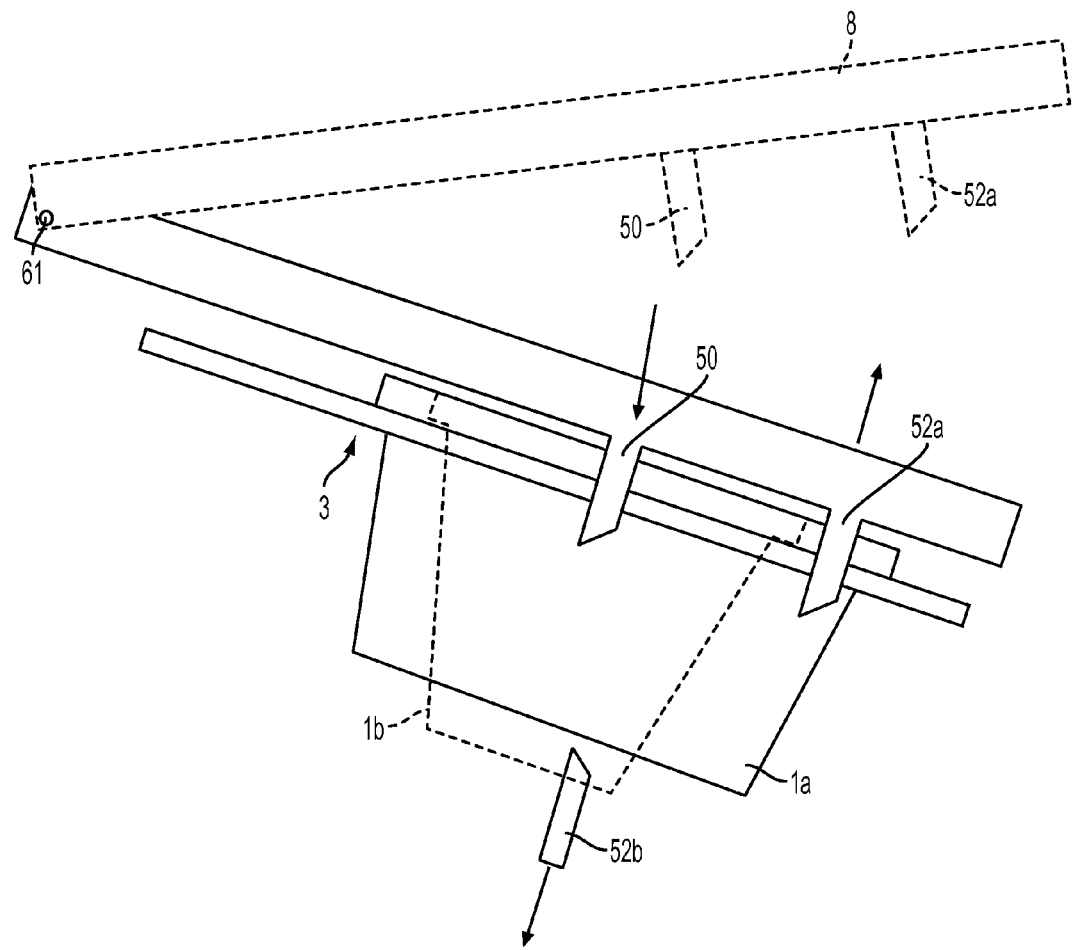
FIG. 5 is a schematic side view of a cartridge holder and cover in an illustrative embodiment.

In accordance with another aspect of the invention, different inlet and/or outlet ports at the cartridge holder may be used with different cartridges to form a beverage. For example, in one embodiment, a first outlet port may be used to receive beverage from a first cartridge, and a second outlet port may be used to receive beverage from a second cartridge. Such an arrangement may be useful, for example, when a first cartridge type is configured to be pierced at a top for a beverage outlet, and a second cartridge type is configured to be pierced at a bottom for a beverage outlet. FIG. 5 shows a schematic side view of an inlet and outlet port configuration that may be employed in an embodiment like that shown in FIG. 3 where a cartridge holder is arranged to receive cartridges of different sizes and/or shapes. As can be seen in FIG. 5, the cover 8 of the beverage machine 10 may include an inlet port 50 and an outlet port 52a, and may be pivotal about a cover pivot 81 between an open position (shown in dashed line) and a closed position (shown in solid line). In this embodiment, the inlet and outlet ports 50, 52a include piercing elements to pierce the cartridge 1 and form an opening, but piercing elements for either or both ports is not required. Instead, the cartridge 1 may have pre-formed inlet/outlet openings, or the openings may be formed by pressure applied to the outside or inside of the cartridge. For example, water pressure may be applied to the exterior of the cartridge 1 to form an inlet opening, and beverage pressure inside the cartridge may form an outlet opening in the cartridge, e.g., a septum, burstable seal or other structure may open in response to pressure.

In this embodiment, when the larger first cartridge 1a is received into the cartridge holder 3 and the cover 8 is moved to the closed position, the inlet and outlet ports 50, 52a may form openings in a top of the cartridge 1a so that water or other fluid may be provided into the cartridge 1a via the inlet port 50, and beverage may be received from the cartridge 1a via the outlet port 52a. However, a second outlet port 52b does not contact the first cartridge 1a because the first cartridge 1a is not tall enough to contact the outlet second port 52*b*. In contrast, when the second cartridge 1*b* is received in the cartridge holder 3, the inlet port 50 may form an opening in a top of the cartridge 1*b* when the cover 8 is in the closed position, but the first outlet port 52*a* does not penetrate the second cartridge 1*b* because the second cartridge 1*b* is smaller in diameter at the rim 19. Instead, the second outlet port 52*b* may form an outlet opening in a bottom of the cartridge 1*b* because in this embodiment, the second cartridge 1*b* is taller than the first cartridge 1*a* so that the piercing element of the outlet port 52*b* penetrates the second cartridge 1*b*. Thus, beverage formed in the cartridge 1*b* may flow to the second outlet port 52*b*. Of course, it will be understood that other inlet/outlet port arrangements are possible for use with different cartridges and are not limited to this illustrative embodiment. For example, the inlet and/or outlet ports may introduce or receive fluid in any suitable locations relative to the cartridges, such as at the top, bottom, side or other locations of the cartridge, and may depend on the cartridge arrangements.

Another aspect of the invention relates to directing fluid, such as steam or water, into a cartridge in a downward direction and receiving beverage from the cartridge in an upward direction. This arrangement is illustrated in FIG. 5 where the inlet 50 is arranged to direct fluid into the cartridge in a downward direction (which in this embodiment is at an angle to the vertical, but is still arranged downwardly and could be arranged in a vertical direction if desired). Beverage exits the cartridge 1*a* in an upward direction to the beverage outlet 52*a*. (Beverage exits the cartridge 1*a* at an angle to the vertical, but could be exit vertically if desired). In this embodiment, the beverage outlet 52*a* includes a piercing element that forms an outlet opening in the cartridge 1*a* below a position where a piercing element of the inlet 50 forms an inlet opening. This relative positioning may aid in removal of beverage from the cartridge 1*a*, but is not required. Also, piercing elements are not required for the inlet 50 or outlet 52*a*. In another embodiment, the cartridge 1*a* could include an exit tube that extends from near a bottom of the cartridge 1*a* to where the cartridge 1*a* communicates with the outlet 52*a*, e.g., so that beverage could be forced to flow up the exit tube and to the outlet 52*a*. This may aid in removing beverage from the cartridge, but is not required. Alternately, the outlet 52*a* could include a tube or other element that extends downwardly into the cartridge to receive beverage.

Figure 6:
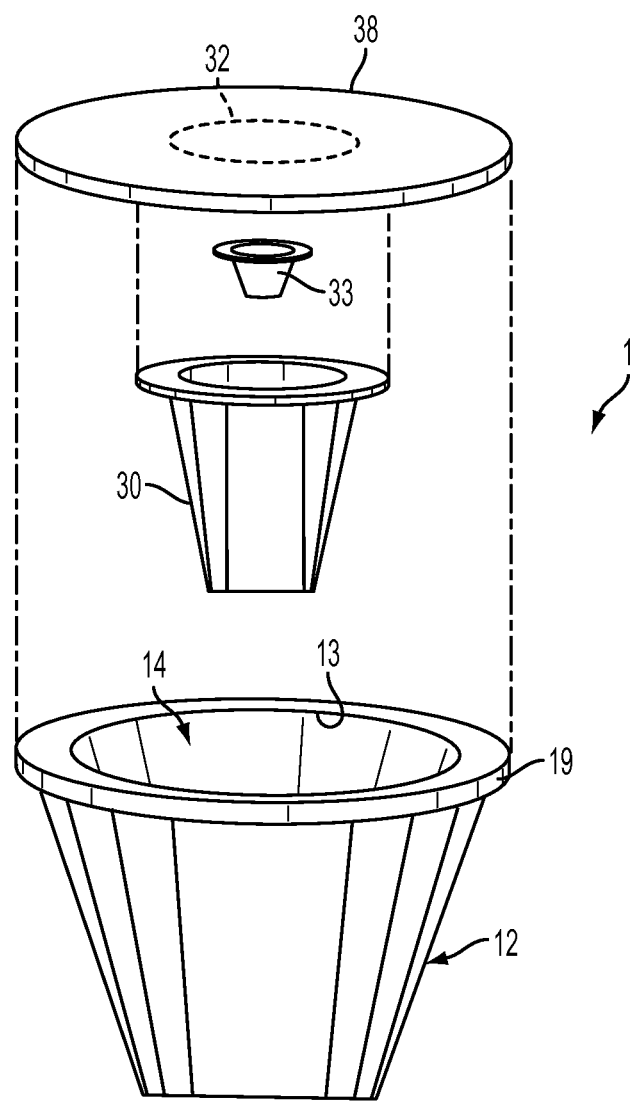
FIG. 6 is an exploded view of a beverage cartridge in an illustrative embodiment.
Figure 7:
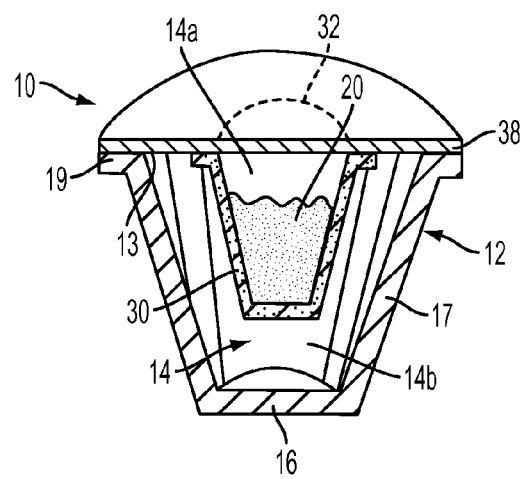
FIG. 7 is an assembled, cross-sectional view of the cartridge of FIG. 6.

Cartridges used with various cartridge holder embodiments may be arranged in different ways, and may depend at least in part on the nature of how a beverage medium in the cartridge is accessed to form a beverage. FIG. 6 shows an exploded view and FIG. 7 shows an assembled view of one cartridge embodiment that may be used in some embodiments. Details regarding such a cartridge are provided in U.S. Pat. No. 8,361,527, which is hereby incorporated by reference. As will be understood, the cartridge 1 may contain any suitable beverage medium 20, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriceuticals, etc.), and/or other beverage-making material (such as powdered milk or other creamers, sweeteners, thickeners, flavorings, and so on).

In this illustrative embodiment, the cartridge 1 includes a container 12 that includes an interior space 14 having a first chamber 14*a* and a second chamber 14*b* that are separated by a filter 30. The container 12 may have a frustoconical cup shape with a sidewall 17 and an opening 13, although other arrangements are possible, e.g., the container 12 may have a fluted, conical, or cylindrical shape, may be in the form of a square or rectangular cup, a domed cup, a sphere or partial sphere, or other suitable form, may have a fluted, corrugated, or otherwise shaped sidewall, and so on. Also, the container 12 need not necessarily have a defined shape, as is the case with some beverage sachets and pods. For example, although the container 12 in this embodiment has a relatively rigid and/or resilient construction so that the container 12 tends to maintain its shape, the container 12 could be made to have a more compliant and/or deformable arrangement, e.g., like a sachet container made from a sheet of deformable material. Thus, an interior space defined by the container 12 may be formed only after the container material is formed around a beverage medium, filter and/or other cartridge components, similar to when two filter paper layers (container material) are joined together around a charge of coffee grounds to form a pod or other form of cartridge.

The opening 13 may be closed by a lid 38, e.g., a flexible sheet of foil and polymer laminate material that is attached to a rim 19 of the container 12. (Although in this embodiment the rim 19 is arranged as an annular flange-like element, the rim 19 may be arranged in other ways. For example, the rim 19 may be the top edge of the sidewall 17 without any flange element.) The filter 30 may be attached to the lid 38 at a periphery 32 that is spaced inwardly and away from the rim 19, e.g., for reasons discussed more below. In addition, the filter 30 may extend from the periphery 32 at least partially into the interior space 14. In this illustrative embodiment, the filter 30 may have a substantially frustoconical shape with fluted or pleated sidewalls and a generally flat bottom 31, as shown. However, the filter 30 may have any suitable shape, such as a cylindrical shape, a square cup shape, a domed shape, a flat sheet, or other. Also, the use of a filter 30 is not necessary, and instead the cartridge 1 may be filterless.

Figure 8:
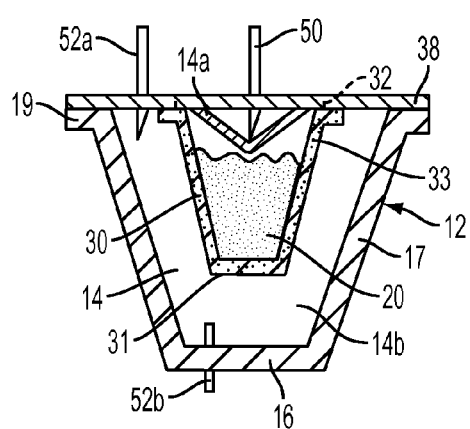
FIG. 8 is a cross-sectional view of the FIG. 6 cartridge and optional inlet and outlet locations for the cartridge.

When using the cartridge 1 to form a beverage, the lid 38 and/or the container 12 may be pierced to introduce liquid into the cartridge and receive beverage from the cartridge. (As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.) To introduce liquid into the cartridge, for example, as shown in FIG. 8, a portion of the lid 38 generally circumscribed by the periphery 32 may be pierced by an inlet piercing element 50 (e.g., a needle) so that water or other liquid may be injected into the cartridge 1. Other inlet piercing arrangements are possible, such as multiple needles, a shower head, a non-hollow needle, a cone, a pyramid, a knife, a blade, etc. A beverage machine that uses the cartridge may include multiple piercing elements of the same type or of different types, as the invention is not limited in this respect. In another arrangement, a beverage machine may include a piercing element (such as a spike) that forms an opening and thereafter a second inlet element (such as a tube) may pass through the formed hole to introduce liquid into (or conduct liquid out of) the container. In other embodiments, the lid 38 may be pierced, or otherwise effectively opened for flow, by introducing pressure at an exterior of the lid 38. For example, a water inlet may be pressed and sealed to the lid 38 exterior and water pressure introduced at the site. The water pressure may cause the lid 38 to be pierced or otherwise opened to allow flow into the cartridge 1. In another arrangement, the lid 38 may include a valve, conduit or other structure that opens when exposed to a suitable pressure and/or when mated with a water inlet tube or other structure. Fluid introduced into the cartridge 1 may be slowed, distributed or otherwise acted on by a flow distributor 33, e.g., an element with holes to help more evenly wet the beverage medium 20.

The cartridge 1 may also be penetrated by an outlet piercing element 52b (e.g., a needle) at a bottom 16 of the container 12, or by an outlet piercing element 52a at a second portion of the lid 38 outside of the periphery 32 and apart from the inlet opening. As with the inlet piercing arrangement, the outlet piercing arrangement may be varied in any suitable way. Thus, the outlet piercing element 52 may include one or more hollow or solid needles, knives, blades, tubes, and so on. Alternately, the cartridge 1 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element 52 remains in place to receive beverage as it exits the opening formed in the container 12 or lid 38. However, in other embodiments, the piercing element 52 may withdraw after forming an opening, allowing beverage to exit the opening and be received without the piercing element 52 being extended into the cartridge 1.

Figure 9:
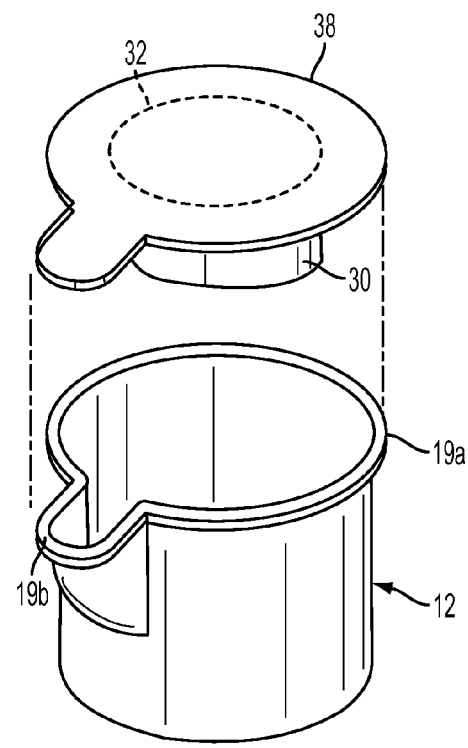
FIG. 9 is perspective view of another beverage cartridge arrangement that may be received by a cartridge holder also arranged to receive the cartridge of FIGS. 6-8.

It should be understood that while a cartridge arranged like that in FIGS. 6-8 may be used in an embodiment like that in FIGS. 3 and 5, other cartridge types are possible, such as those described in U.S. Pat. Nos. 6,607,762; 6,645,537; 6,589,577 and others. Also, it should be appreciated that cartridges that can be received by a cartridge holder 3 may differ in shape, in addition to, or instead of, size (at least in a region where the cartridges are engaged by the cartridge holder to support the cartridge). For example, U.S. Pat. No. 8,361,527 also describes a cartridge with an irregular rim shape, which is shown in FIG. 9. In this embodiment, the cartridge 1 is arranged similarly to that in FIGS. 6-8, but the container 12 has a rim 19 with a circular portion 19a and a spout portion 19b that extends from the circular portion 19a. Thus, the rim 19 has an irregular shape, and the cartridge holder 3 may be arranged to not only accommodate a larger overall rim size of the cartridge 1, but also the irregular shape of the rim 19.

The example of FIG. 5 is only one that illustrates how different inlet and/or outlet ports 50, 52 may be used for different cartridges. That is, in accordance with another aspect of the invention, one or more inlet or outlet ports 52 may be movable to exchange fluid, or not, with a cartridge in the holder 3. For example, a beverage outlet associated with the cartridge holder may movable between first and second positions to receive, or not receive, beverage from a cartridge. In some embodiments, a beverage outlet may be movable between positions in which the outlet is located within a cartridge receiving area, or outside of a cartridge receiving area depending on a type of cartridge that is received in the cartridge holder. For example, different cartridges may have different sizes and/or shapes, and a beverage outlet may be movable to receive beverage, or not, based on the cartridge received in the holder.

Figure 10:
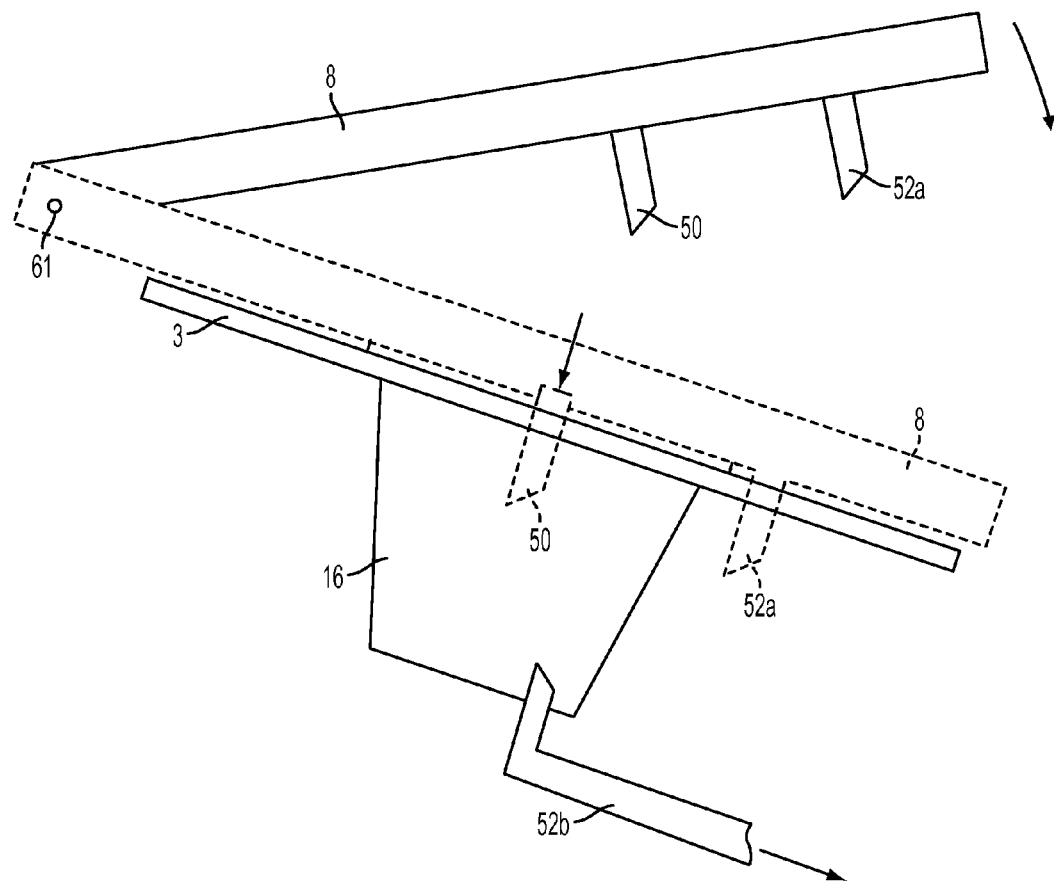
FIG. 10 is schematic side view of a cartridge holder and cover in an illustrative embodiment in which different outlet ports are used for different cartridges.
Figure 11:
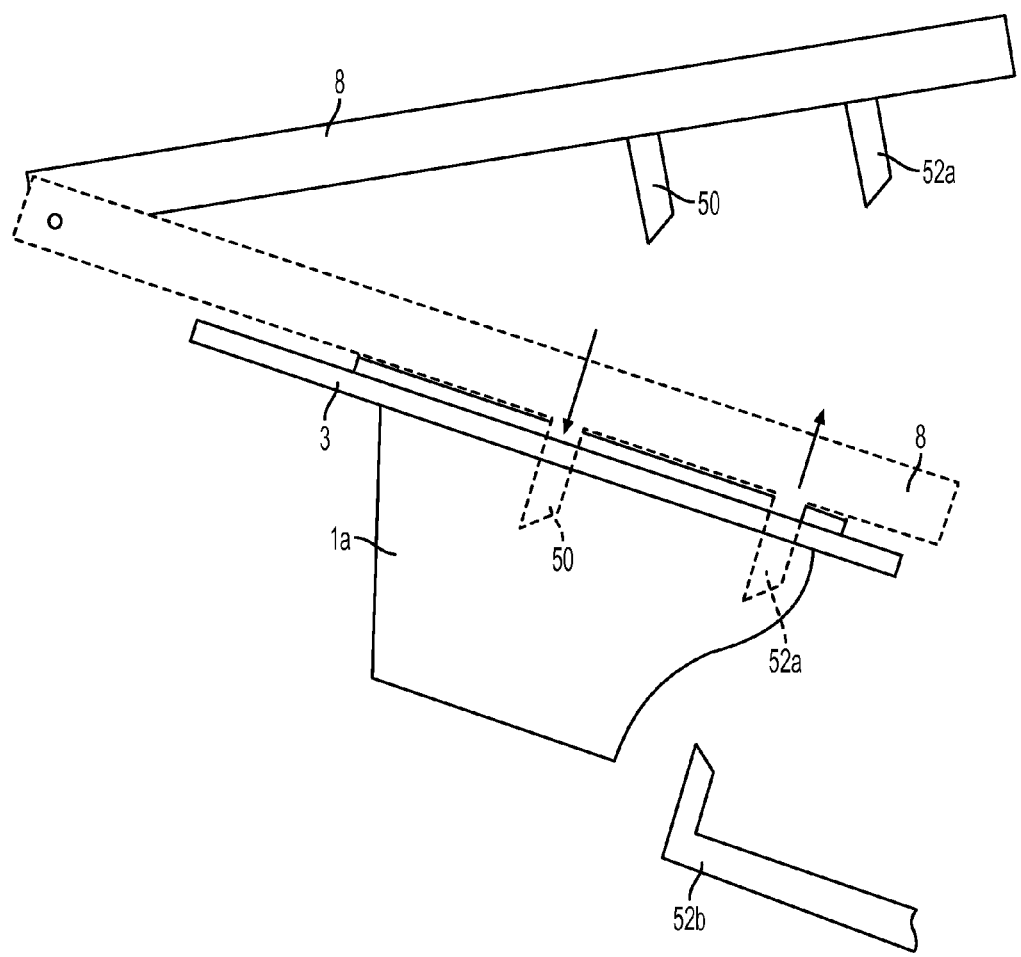
FIG. 11 is a schematic side view of the cartridge holder of FIG. 10 illustrating how a different outlet port is used with a different cartridge than that shown in FIG. 10.

FIGS. 10 and 11 illustrate an embodiment in which a beverage outlet is movable depending on a type of cartridge received in a cartridge holder. FIG. 10 shows a schematic side view of the cartridge holder 3 of FIG. 3 with a second cartridge 1b having a relatively smaller, circularly-shaped rim diameter (e.g., as seen in FIGS. 6 and 7) received in the holder 3. In contrast, FIG. 11 shows a schematic side view of the cartridge holder 3 of FIG. 3 with a first cartridge 1a having a relatively larger rim diameter and an irregular rim shape (e.g., as seen in FIG. 9) received in the holder 3. The view in FIG. 10 is similar to that shown in FIG. 5 for the second cartridge 1b. That is, the second cartridge 1b, which has a relatively small circular rim 19 in this embodiment, is pierced at the top by the inlet port 50 to accommodate downward inflow of fluid into the cartridge 1b, and pierced at the bottom by the second outlet port 52b to accommodate downward outflow of beverage from the cartridge 1b.

However, with the first cartridge 1a held in the cartridge holder 3, the top of the cartridge is pierced by both the inlet port 50 and the first outlet port 52a. The first cartridge 1a may be pierced by the first outlet port 52a at an area of the lid 38 which is located in the spout area near the spout portion 19b of the rim 19, although other areas of the lid are possible. Inclining the cartridge holder 3 and cartridge 1a such that the spout portion 19b is at a lower end of the cartridge 1a may aid in removing beverage from the cartridge 1a, since beverage may collect in the spout area for outflow in an upward direction.

Note that while in the FIG. 5 embodiment, the first cartridge 1a is too short to contact the second outlet port 52b, this need not be the case and the first cartridge 1a may be made taller. In such a case, the second outlet port 52b may be moved out of a cartridge receiving space or area so that the port 52b can avoid contact with the cartridge 1a. Such movement may be accomplished in different ways, such as by a motorized drive, a linkage, having a user physically move one of the ports into/out of a cartridge receiving area, and others. In one aspect of the invention, one or more ports may be selected for use with a cartridge based on one or more features of the cartridge that is inserted into the cartridge holder 3. For example, insertion of a cartridge having a relatively larger rim diameter may cause the second outlet port 52b to be moved out of a cartridge receiving area so as to avoid potential contact with the cartridge 1. In other embodiments, insertion of a particular cartridge type may release a port for movement, e.g., insertion of the larger rim cartridge may release the second outlet port 52b so that the cartridge 1a may contact the second outlet port 52b and move it.

Figure 12:
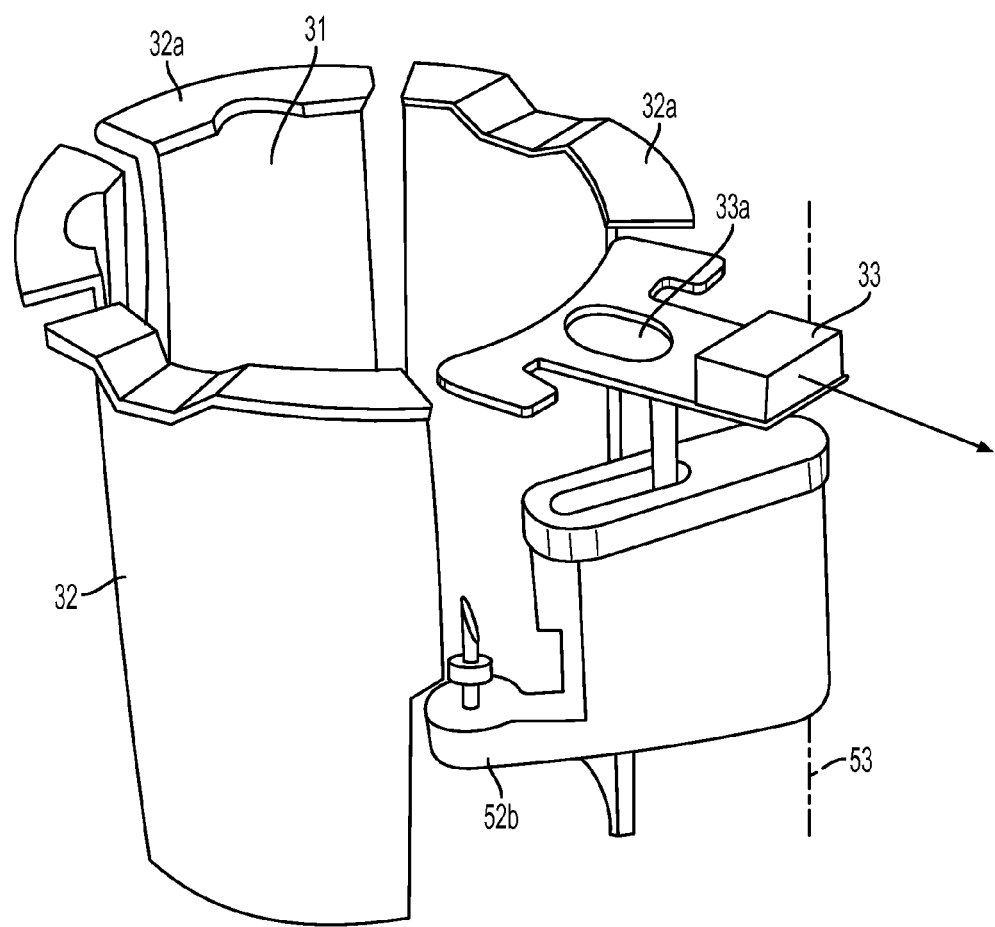
FIG. 12 is a side view of a cartridge holder having an outlet port that is pivotal about a vertical axis.
Figure 13:
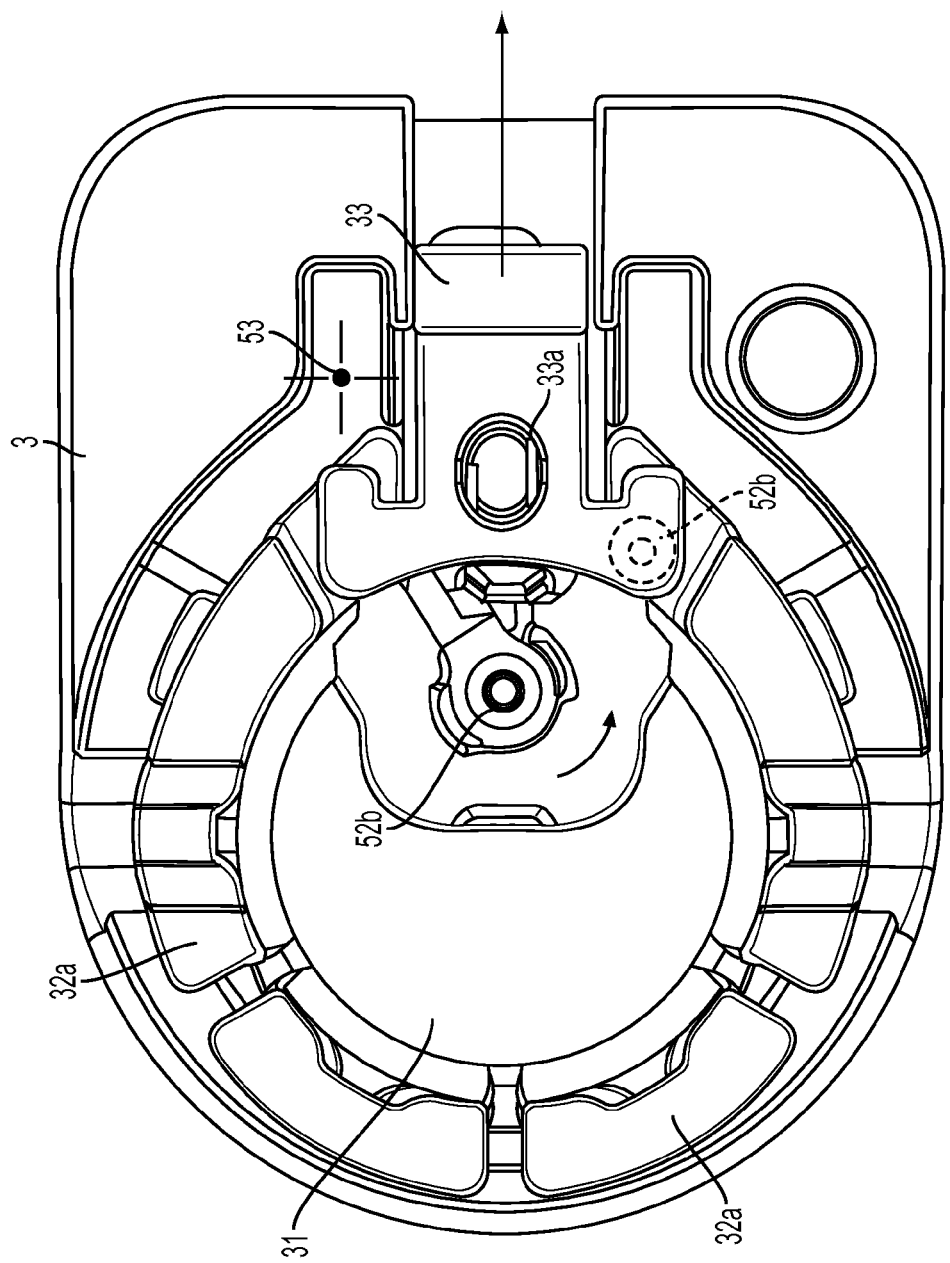
FIG. 13 is a top view of the FIG. 12 cartridge holder.

For example, FIGS. 12 and 13 show an illustrative embodiment in which insertion of a cartridge having a spout, such as that shown in FIG. 9, causes the second outlet port 52b to move out of a cartridge receiving area. In this embodiment, one of the movable portions 32, e.g., a trigger 33, may contact the spout area of the cartridge 1a and be moved radially outwardly, i.e., to the right in FIGS. 12 and 13. The trigger 33 may be coupled to the second outlet port 52b by a linkage that causes the second outlet port 52b to pivot about an axis 53 as the sliding portion 32 is moved radially outwardly. This may move the second outlet port 52b out of an area of potential contact with the cartridge 1a. The trigger 33 may be spring loaded such that when the first cartridge 1a having a spout is removed from the cartridge holder 3, the trigger 33 may move radially inwardly, allowing the second outlet port 52b to pivot back into a cartridge receiving area. Thus, if a second cartridge 1b is inserted into the holder 3 having no spout, the trigger 33 may remain stationary, and the second outlet port 52b may pierce the second cartridge 1b at its bottom or other suitable location. The second outlet port 52b may include or be connected to a conduit to conduct beverage from the second cartridge 1b to a dispensing area of the beverage forming machine 10, or beverage may simply exit the cartridge 1b without being conducted by a conduit. Thus, a beverage outlet or outlet port need not include a conduit to conduct beverage, but rather may be arranged in any suitable way to permit beverage to exit a cartridge.

Figure 14:
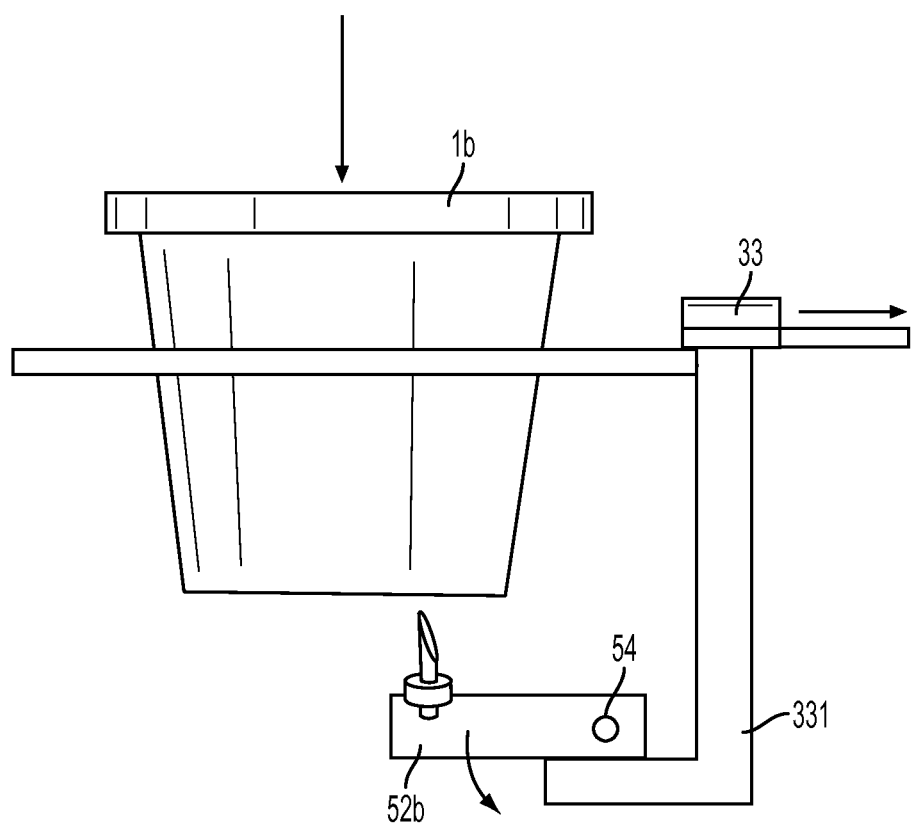
FIG. 14 is a side view of a cartridge holder having an outlet port that is pivotal about a horizontal axis.

In another embodiment, movement of the trigger or other part of the cartridge holder 3 may release one or more ports for movement, e.g., based on contact with a cartridge, so that the port does not pierce or otherwise interact with the cartridge to exchange fluid. For example, FIG. 14 shows an embodiment in which a trigger 33 like that in FIGS. 12 and 13 may be moved by a contact with a spout of a first cartridge 1a. Movement of the trigger 33 may release the second outlet port 52b for movement upon contact with the cartridge 1a so that the second outlet port 52b does not substantially resist movement. For example, with the first cartridge 1a inserted into the cartridge holder 3, a bottom of the first cartridge 1a may contact the second outlet port 52b and pivot the port 52b about a horizontal axis 54 so the port 52b moves out of a cartridge receiving area and does not pierce the cartridge 1a. However, if a second cartridge 1b is inserted into the cartridge holder 3, the lack of movement of the trigger 33 may lock the second outlet port 52b in place so that it pierces or otherwise interacts with the second cartridge 1b to receive beverage. In this embodiment, the trigger 33 is linked to a latch 331 that engages with the second outlet port 52b to prevent pivoting of the port 52b about the axis 54 when the trigger 33 is positioned to the left. However, movement of the trigger 33 to the right disengages the latch 331 from the port 52b, allowing the port 52b to pivot about the axis 54. The trigger 33 may be spring loaded to move to the left as shown in FIG. 14; thus, the latch 331 may normally engage the port 52b unless the trigger 33 is moved, e.g., by a first cartridge 1a.

Although the examples above show and describe embodiments in which only one outlet port is moved, other arrangements are possible, such as where two or more outlet ports are moved, one or more inlet ports are moved, or other combinations of inlet/outlet selections are made. Also, movement of inlets and/or outlets may be effected by a motor drive or other mechanism, and may be controlled by based on reading of a machine readable feature or other indicia on a cartridge. For example, the machine 10 may read an RFID tag, barcode, etc., on a cartridge 1, and make suitable port selections based on a cartridge type or other information associated with the identified cartridge 1.

Figure 15:
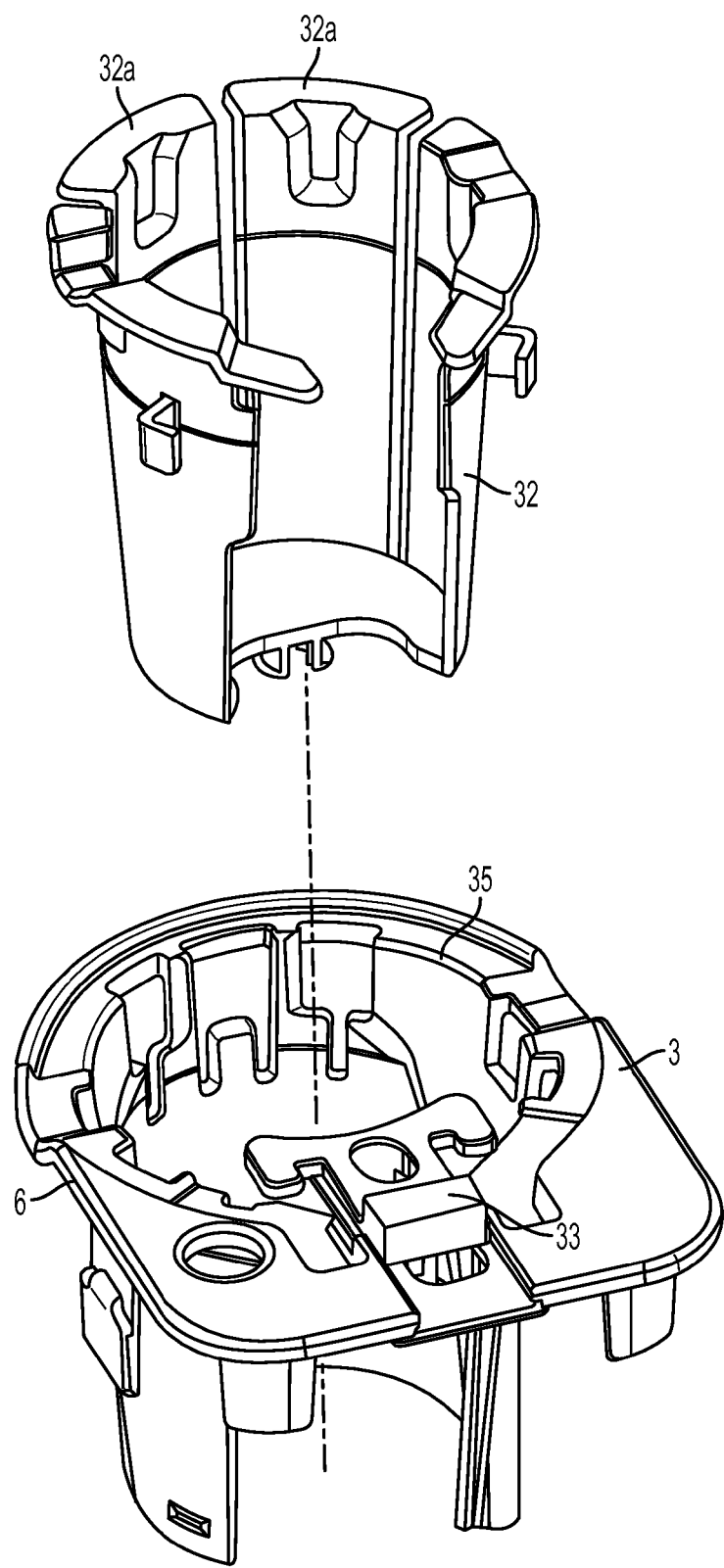
FIG. 15 is a partially exploded view of a cartridge holder employing the engagement portion of FIG. 4.
Figure 16:
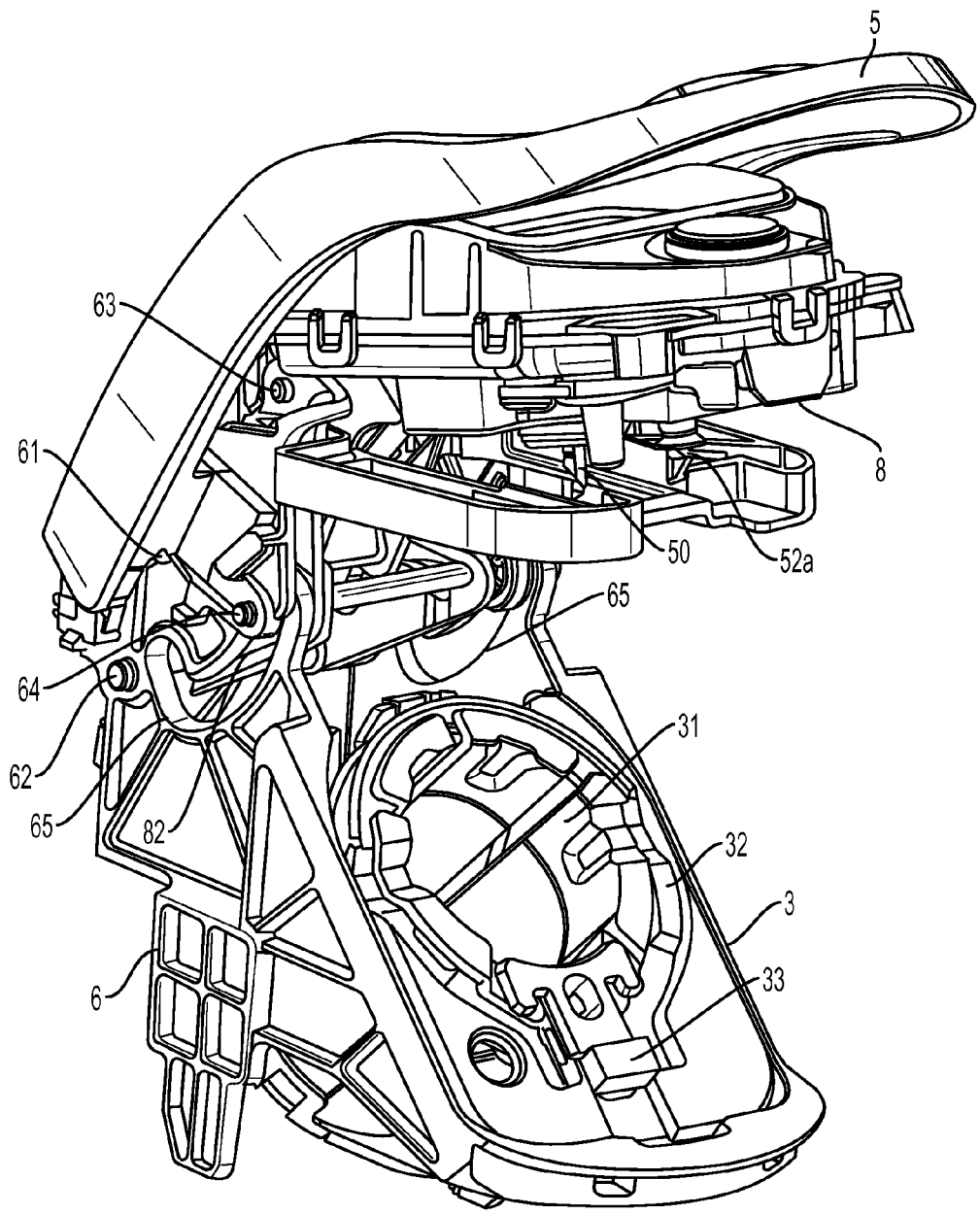
FIG. 16 is a perspective view of a cartridge holder, associated cover and components for moving the cover in an illustrative embodiment.

FIGS. 15 and 16 show an exploded view and an assembled view of a cartridge holder, associated cover, handle actuator and other selected components of a beverage forming apparatus 10. In this embodiment, the engagement portion of the cartridge holder 3 includes a plurality of movable portions 32 in the form of "fingers" or wall portions that are joined together at a bottom of the engagement portion, as in FIG. 4. This embodiment also includes a trigger 33 to cause and/or allow movement of an outlet port from a cartridge receiving area. That is, this embodiment is arranged to receive both a first cartridge 1a that has an irregular rim having a circular portion and spout portion, and a second cartridge 1b that has a circular rim with a diameter smaller than that of the circular portion of the first cartridge 1a. Contact of the spout area of the first cartridge 1a with the trigger 33 causes the trigger 33 to move radially outwardly, releasing the second outlet port 52b for movement (or actually moving the second outlet port 52b). Note that the wall portions 32 of the engagement portion are arranged to provide a suitable opening for the second outlet port 52b to move into/out of the cartridge receiving area as needed.

As can be seen in FIG. 15, the engagement portion is received into a hole 35 in a portion of the frame 6 that helps define the cartridge holder 3. In this embodiment, the engagement portion is supported in the hole 35 so that the wall portions 32 located opposite the trigger 33 have a smaller range of radial motion than wall portions 32 located nearer the trigger 33. That is, one or more wall portions 32 opposite the trigger 33 may be permitted to move radially outwardly to some extent, but then contact the hole 35 or other part of the frame 6 so the wall portion(s) 32 are prevented from further outward radial movement. This may help the cartridge holder 3 to urge a cartridge 1a having a spout section into proper contact with the trigger 33 and move the trigger 33 suitably radially outwardly. In addition, this may help the cartridge holder 3 to properly position the cartridge 1a for alignment with an inlet and outlet port 50, 52a. That is, the trigger 33 may be biased to move radially inwardly by a spring or other resilient element of suitable strength so that insertion of the cartridge having a spout section causes the wall portion(s) 32 opposite the trigger 33 to flex outwardly and contact the hole 35 or other stop of radial movement before the cartridge 1a is fully inserted into the opening 31. Further insertion of the cartridge 1a may then cause the trigger 33 to slide outwardly because the wall portion(s) 32 opposite the trigger 33 are prevented from further outward radial movement. This may ensure that the cartridge 1 is properly positioned for piercing by an inlet and/or outlet piercing element.

FIG. 16 also shows how in this embodiment the cover 8 may be moved relative to the cartridge holder 3. The cover 8 is arranged for pivotal movement relative to the frame 6 about a cover pivot 61 based on movement of a handle 5 which is pivotally mounted to the cover 8 at a handle pivot 63. A plate 81 is also pivotally mounted to the frame 6 about a plate pivot 62 and moves based on movement of the handle 5. The plate 81 operates to contact a cartridge 1 placed in the cartridge holder 3, and push the cartridge 1 into the holder 3 so that the cartridge 1 is fully received into the holder 3 before the cover 8 engages the cartridge 1. This helps ensure that the cartridge 1 is fully seated in the holder 3 before piercing elements on the cover 8 pierce the cartridge 1. A pivot pin 64 of the handle 5 is engaged with a slot 82 of the plate 81 and moves in a cam slot 65 of the frame 6 so that as the handle 5 is pivoted about the handle pivot 63 from an open position (shown in FIG. 16) to a closed position, the pivot pin 64 moves in the cam slot 65, thereby pivoting the plate 81 about the plate pivot 62 toward the cartridge holder 3. At the same time, the cover 8 is pivoted about the cover pivot 63 to move toward the cartridge holder 3. The plate 81 is arranged to contact a cartridge 1 in the holder 3 before the cover 8, forcing the cartridge 1 to be seated into the holder 3. This action may cause movable portions 32 of the engagement portion to move as needed to receive the cartridge 1. Further movement of the handle 5 toward the closed position causes the pivot pin 64 to move further downwardly in the cam slot 65 so the cover 8 engages the cartridge 1. In this embodiment, piercing elements at the inlet and/or outlet ports 50, 52a may pierce the cartridge 1, although such piercing elements are not required. With the handle 5 at a closed position, the pivot pin 64 may move into a "J" shaped section of the cam slot 65 which effectively locks the cover 8 and the plate 81 in place over the cartridge holder 3. Lifting of the handle 5 from the closed position reverses movement of the pivot pin 64 in the cam slot 65, thereby pivoting the cover 8 and plate 81 to the open positions.

Figure 17:
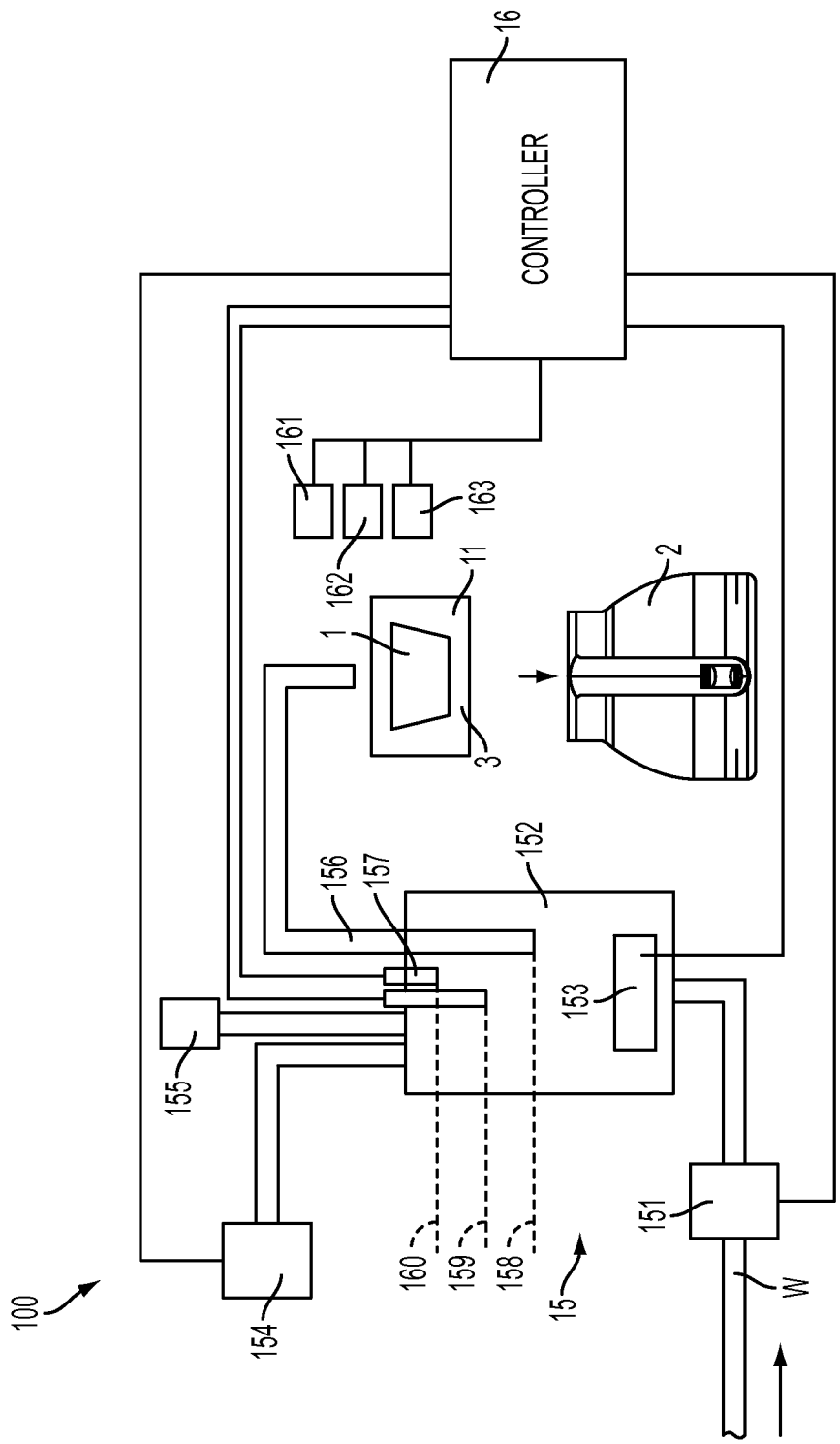
FIG. 17 is a schematic diagram of components of a beverage forming apparatus in an illustrative embodiment.

FIG. 17 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the container 2 via a beverage outlet.

The liquid supply 15 in this embodiment controls the volume of liquid provided to the beverage forming station 11 by filling the tank to a liquid dispense level 159, 160 and then pressurizing the tank 152 by way of an air pump 154 so that liquid in the tank 152 is forced out of the conduit 156 to the beverage forming station 11. The volume of liquid delivered to the beverage forming station 11 is equal to the volume in the tank 152 between the liquid delivery level 159, 160 and a post-delivery level 158 at a bottom of the conduit 156 in the tank 152. Since there are two delivery levels 159, 160 in this embodiment, two different volumes can be provided to the beverage forming station 11. However, more than two levels, or a single level, may be used.

In this embodiment, the liquid supply 15 provides liquid to the tank 152 via a valve 151 that is coupled to a source W. The source W may have any suitable arrangement, e.g., may provide liquid from a removable or fixed storage tank, a mains water supply or other source. Thus, in some cases, the liquid provided to the tank 152 may vary in temperature by a wide degree depending on various factors, such as time of year, a temperature of a room in which the machine 10 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the valve 151 is controlled by the control circuit 16 to open and close to provide a desired volume of liquid to the tank 152. For example, if the tank 152 is empty or at the post-dispense level 158, the valve 151 may be opened until a conductive probe or other liquid level sensor 157 provides a signal to the control circuit 16 that indicates when liquid arrives at the dispense level 159, 160. In response to the level sensor 157 detecting liquid at the sensor 157, the control circuit 16 may close the valve 151. Of course, other arrangements are possible, such using a pump to move liquid from a storage reservoir to the tank 152.

Although in this embodiment the liquid level sensor includes a pair of conductive probes capable of contacting liquid in the tank 152 and providing a signal (e.g., a resistance change) indicative of liquid being present at respective dispense levels 159 or 160 in the tank 152, the liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration. Moreover, the liquid level sensor may include two or more different types sensors to detect different levels in the tank. For example, a pressure sensor may be used to detect liquid at the dispense level 160 (e.g., complete filling of the tank 152 may coincide with a sharp rise in pressure in the tank 152), while a conductive probe may be used to detect liquid at the other dispense level 159.

Further, a liquid level sensor need not be used to fill the tank to the dispense level 159, 160. Instead, other techniques may be used to suitably fill the tank 152, such as opening the valve 151 for a defined period of time that is found to correspond to approximate filling of the tank 152 to the desired level. Of course, other arrangements for providing liquid to the tank 152 are possible, such as by a pump (e.g., a centrifugal pump, piston pump, solenoid pump, diaphragm pump, etc.), gravity feed, or other, and the way by which the tank is filled to the dispense level 159, 160 may depend on the technique used to provide liquid to the tank. For example, control of a volume of liquid provided to fill the tank 152 to the dispense level 159, 160 may be performed by running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the beverage forming station 11 are referred to as a "liquid conditioner.")

In this embodiment, liquid may be discharged from the tank 152 by an air pump 154 operating to force air into the tank 152 to pressurize the tank and force liquid to flow in the conduit 156 to the beverage forming station 11. Since the conduit extends downwardly into the tank 152, the volume of liquid delivered to the forming station 11 is defined as the volume in the tank 152 between the dispense level 159, 160 and the bottom end of the conduit 156. Again, liquid may be caused to flow from the tank 152 to the beverage forming station 11 in other ways. For example, a pump may be used to pump liquid from the tank 152 to the forming station 11, liquid may be allowed to flow by gravity from the tank 152, and others. A vent 155, which can be opened or closed to vent the tank 152, may be provided to allow the tank 152 to be filled without causing a substantial rise in pressure in the tank 152 and to allow liquid to be delivered from the tank 152 by pressurizing the tank using the air pump 154. In this embodiment, the vent 155 is actually not controlled by the control circuit 16, but remains always open with an orifice of suitable size to allow venting for filling of the tank 152, and air pressure buildup in the tank 152 to allow liquid delivery. Other flow control features may be provided as well, such as a check valve or other flow controller that can prevent backflow in the conduit between the source W and the tank 152, or between the tank 152 and the beverage forming station 11.

The beverage forming station 11 may use any beverage making ingredient, such as ground coffee, tea, a flavored drink mix, or other beverage medium, e.g., contained in a cartridge 1 or not. Alternately, the beverage forming station 11 may function simply as an outlet for heated, cooled or otherwise conditioned water or other liquid, e.g., where a beverage medium is contained in the container 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

In accordance with an aspect of the invention, the beverage forming apparatus may include multiple detectors to detect characteristics of a cartridge received in the cartridge holder. Operation of the apparatus 100 may be controlled by the control circuit 16 based on information detected by the detectors. For example, in the embodiment shown in FIG. 17, the apparatus includes first, second and third detectors 161, 162, 163 that each detect a different characteristic regarding a cartridge 1 in the cartridge holder 3. A first detector 161 may detect the presence or absence of a cartridge 1, e.g., may include an infrared detector that illuminates an area of the cartridge holder 3 with infrared light and detects whether infrared light is reflected by a cartridge or not. Detection of a suitable amount or other level of reflected light may be used to determine that a cartridge 1 is present, whereas no or lower light levels may indicate the absence of a cartridge. Such an infrared detector may include an infrared emitter and a photodetector or other suitable element(s). Other detector arrangements are possible, such as mechanical switches, a bar code reader, an RFID interrogator, etc.

A second detector 162 may detect a type of cartridge, e.g., may detect whether a cartridge includes a spout portion or not. The second detector may be arranged in a variety of different ways, and in one embodiment may include the trigger 33 of FIGS. 12-16 and a switch to detect movement of the trigger 33. For example, the trigger 33 may include a magnet that moves with the trigger 33 and a reed or other suitable switch may detect the presence or absence of the magnet, thereby detecting movement of the trigger 33. Other arrangements for the second detector 162 are possible, such as an optical detector, bar code reader, etc.

The third detector 163 may detect information related to whether a cartridge is authorized for use with the beverage forming apparatus, and may include a bar code reader, a camera or other image capture device with image analysis capability, an RFID interrogator, and others. In this illustrative embodiment, the third detector 163 includes an illumination element that illuminates a portion of a cartridge with suitable light, e.g., one or more LED sources may illuminate a cartridge with light having any suitable set of wavelengths. The third detector 163 may also include a light detector that is arranged to detect light emitted and/or reflected by a cartridge portion and assess whether the light detected is consistent with an authorized cartridge. For example, authorized cartridges may carry a security ink or other material that provides a specific spectral response to being illuminated by certain light. The third detector 163 may detect whether the spectral response is present, and if so, indicate that the cartridge is authorized for use in forming a beverage.

The control circuit 16 may control operation of the liquid supply 15 and/or other portions of the apparatus 100 based on information detected by the first, second and/or third detectors 161, 162, 163. For example, if no cartridge is detected by the first detector 161 and an operator presses a brew indication button, the control circuit 16 may cause the apparatus 100 to perform a cleaning operation by which the cartridge holder 3 and/or other parts of the apparatus 100 are cleaned. However, if a cartridge 1 is detected, the control circuit 16 may cause the display of beverage forming options to a user at the user interface 14, may start a beverage creation cycle, may begin heating of water in the tank 152, etc. As another example, if the second detector 162 detects a particular type of cartridge, the control circuit 162 may control the system to adjust beverage forming parameters in some way, e.g., by adjusting a heating temperature, an amount of liquid used to make a beverage, displaying and requiring particular user input to form a beverage, and so on. The control circuit 16 may prevent all or certain ones of beverage production processes if a cartridge is not detected by the third detector 163 to be an authorized one. Instead, the control circuit 16 may only permit a cleaning operation, provided no cartridge is detected in the cartridge holder. Alternately, the control circuit 16 may cause the apparatus to perform a default beverage process, e.g., including a specific set of brew water temperature, volume, delivery time, etc.

While aspects of the invention may be used with any suitable cartridge, or no cartridge at all, some cartridges may include features that enhance the operation of a beverage forming apparatus 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a container 2. As will be understood by those of skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus, comprising:
 a frame arranged to support components of the beverage forming apparatus;
 a cartridge holder having an opening arranged to engage with a cartridge placed in the opening and support a weight of the cartridge, the cartridge holder including a first beverage outlet arranged to receive beverage from a cartridge held by the cartridge holder, the first beverage outlet being movable relative to the opening between first and second positions based on a size and/or shape of a cartridge held by the cartridge holder;
 a cover arranged to cooperate with the cartridge holder to at least partially enclose a cartridge held by the cartridge holder for formation of a beverage using the cartridge; and
 a liquid supply system at least partially supported by the frame arranged to provide a liquid for combination with a beverage medium in a cartridge held by the cartridge holder to form a beverage.

2. The apparatus of claim 1, wherein the first beverage outlet is arranged to not receive beverage from a cartridge in the first position, and is arranged to receive beverage from a cartridge in the second position.

3. The apparatus of claim 1, wherein the first beverage outlet is positioned outside of a cartridge receiving area of the cartridge holder in the first position, and the first beverage outlet is positioned within a cartridge receiving area of the cartridge holder in the second position.

4. The apparatus of claim 1, wherein the first beverage outlet is moved from the second position to the first position by a cartridge contacting and moving the first beverage outlet as the cartridge is placed in the cartridge holder.

5. The apparatus of claim 1, wherein the cartridge holder is arranged to receive first and second cartridges that are differently sized and/or shaped relative to each other in a region where the cartridge holder engages with the first and second cartridges, and wherein the first beverage outlet is arranged to be positioned in the first position with the first cartridge received in the cartridge holder, and to be positioned in the second position with the second cartridge received in the cartridge holder.

6. The apparatus of claim 5, wherein the cartridge holder includes a trigger that is mounted for movement relative to the opening, and wherein movement of the trigger moves the first beverage outlet between the first and second positions.

7. The apparatus of claim 6, wherein the trigger is movable by contact with a spout of the first cartridge to move the first beverage outlet from the second position to the first position.

8. The apparatus of claim 7, wherein the trigger remains stationary relative to the opening with the second cartridge received by the cartridge holder such that the first beverage outlet is in the second position to receive beverage from the second cartridge.

9. The apparatus of claim 1, wherein the cover includes a liquid inlet to introduce liquid from the liquid supply system to a cartridge held in the cartridge holder.

10. The apparatus of claim 9, wherein the cover includes a second beverage outlet to receive beverage exiting a cartridge held in the cartridge holder.

11. The apparatus of claim 10, wherein the liquid inlet and the first and second beverage outlets each include a piercing element to pierce a cartridge.

12. The apparatus of claim 11, wherein the piercing elements of the liquid inlet and the second beverage outlet face downwardly and the first beverage outlet faces upwardly with the cover cooperating with the cartridge holder to at least partially enclose a cartridge.

13. The apparatus of claim 1, wherein the cover is movable relative to the cartridge holder between an open position in which the cartridge holder is exposed to receive a cartridge into the opening, and a closed position in which the cover cooperates with the cartridge holder to at least partially enclose a cartridge held by the cartridge holder.

14. The apparatus of claim 1, wherein the cartridge holder is arranged to receive a first cartridge having a circular rim, and a second cartridge having a rim with a partially circular portion and a spout section extending outwardly from the partially circular portion.

15. The apparatus of claim 1, further comprising a trigger arranged to interact with a first cartridge, and a linkage connected to the trigger and operable to cause movement of the first beverage outlet between the first and second positions based on movement of the trigger.

16. The apparatus of claim 10, wherein the liquid inlet and the second beverage outlet face downwardly and the first beverage outlet faces upwardly with the cover cooperating with the cartridge holder to at least partially enclose a cartridge.

* * * * *